US009813546B2

(12) United States Patent
Kondo

(10) Patent No.: US 9,813,546 B2
(45) Date of Patent: Nov. 7, 2017

(54) ELECTRONIC APPARATUS AND METHOD FOR CONTROLLING ELECTRONIC APPARATUS

(71) Applicant: KYOCERA CORPORATION, Kyoto (JP)

(72) Inventor: Masuo Kondo, Neyagawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/354,714

(22) Filed: Nov. 17, 2016

(65) Prior Publication Data

US 2017/0155755 A1    Jun. 1, 2017

(30) Foreign Application Priority Data

Nov. 27, 2015   (JP) ................... 2015-231670

(51) Int. Cl.
*H04M 1/725* (2006.01)
*H04B 1/3827* (2015.01)
*H04B 1/38* (2015.01)

(52) U.S. Cl.
CPC ... *H04M 1/72569* (2013.01); *H04M 1/72527* (2013.01); *H04B 2001/3866* (2013.01); *H04B 2001/3894* (2013.01); *H04M 2250/12* (2013.01)

(58) Field of Classification Search
CPC ......... H04M 1/72569; H04M 1/72527; H04M 2250/12; H04B 2001/3866; H04B 2001/3894
USPC ...................................... 455/550.1
See application file for complete search history.

(56) References Cited

U.S. PATENT DOCUMENTS

| 6,215,498 | B1* | 4/2001 | Filo ...................... G06F 3/011 345/419 |
| 6,912,270 | B1* | 6/2005 | Drury ................. H04M 11/045 379/40 |
| 7,181,192 | B2* | 2/2007 | Panasik ............. H04M 1/72538 340/436 |
| 7,284,434 | B1* | 10/2007 | Fleming ................ G01N 29/07 73/644 |
| 7,978,092 | B2* | 7/2011 | Osaka ................. H04M 1/0274 340/5.23 |

(Continued)

FOREIGN PATENT DOCUMENTS

JP    2012-074922    4/2012

*Primary Examiner* — Hai V Nguyen
(74) *Attorney, Agent, or Firm* — Duane Morris LLP

(57) ABSTRACT

An electronic apparatus comprises an apparatus case, at least one processor, a submergence detector, and a motion detector. The at least one processor is configured to receive an incoming call from an external communication apparatus and to perform a voice call with the external communication apparatus. The submergence detector is configured to detect a submergence state in which the apparatus case is located underwater. The motion detector is configured to detect a predetermined specific motion of the apparatus case. The at least one processor controls a setting status of a motion answer mode in which the incoming call is answered and the voice call is accordingly started in response to detection, by the motion detector, of the specific motion. When the submergence state is no longer detected by the submergence detector, the at least one processor enables the motion answer mode.

12 Claims, 19 Drawing Sheets

(56) References Cited

U.S. PATENT DOCUMENTS

| | | | | |
|---|---|---|---|---|
| 8,311,595 B2* | 11/2012 | Takatsuka | | H04M 1/0202 441/89 |
| 8,489,141 B2* | 7/2013 | Tanaka | | H01H 13/702 455/418 |
| 8,531,316 B2* | 9/2013 | Velado | | B63J 99/00 340/286.02 |
| 8,588,758 B2* | 11/2013 | Ullrich | | G06F 3/017 455/414.1 |
| 8,981,925 B2* | 3/2015 | Chapin | | G08B 1/08 340/539.1 |
| 9,183,560 B2* | 11/2015 | Abelow | | G06Q 10/067 |
| 9,191,749 B2* | 11/2015 | Nabata | | H04M 1/03 |
| 9,204,223 B2* | 12/2015 | Nabata | | H04R 17/00 |
| 9,224,096 B2* | 12/2015 | Oppenheimer | | G06F 21/50 |
| 9,363,591 B2* | 6/2016 | Ozasa | | H04R 7/045 |
| 9,367,100 B2* | 6/2016 | Ganguly | | G06F 1/1656 |
| 9,392,371 B2* | 7/2016 | Nabata | | G10K 11/178 |
| 9,401,178 B2* | 7/2016 | Bentley | | H04N 7/181 |
| 9,406,336 B2* | 8/2016 | Bose | | H04N 7/188 |
| 9,418,657 B2* | 8/2016 | Daniels | | H04R 1/1041 |
| 9,438,990 B2* | 9/2016 | Miyano | | H04R 7/045 |
| 9,461,605 B2* | 10/2016 | Sekiyama | | H03G 3/20 |
| 9,529,437 B2* | 12/2016 | Kahn | | G06F 3/017 |
| 9,607,652 B2* | 3/2017 | Bose | | G11B 27/031 |
| 9,619,891 B2* | 4/2017 | Bose | | G06T 7/20 |
| 9,635,159 B2* | 4/2017 | Baldini | | H04W 4/18 |
| D786,211 S * | 5/2017 | Puranen | | D14/138 AB |
| 9,660,684 B2* | 5/2017 | Rayner | | H04B 1/3888 |
| 2003/0152145 A1* | 8/2003 | Kawakita | | H04N 5/77 375/240.12 |
| 2004/0113836 A1* | 6/2004 | Rickerson, Jr. | | B63C 9/20 342/357.54 |
| 2005/0148673 A1* | 7/2005 | Harbut | | A61K 31/137 514/650 |
| 2005/0208925 A1* | 9/2005 | Panasik | | H04M 1/72538 455/404.1 |
| 2005/0222270 A1* | 10/2005 | Olney | | A61K 31/137 514/650 |
| 2005/0265123 A1* | 12/2005 | Pope | | B63C 11/26 367/99 |
| 2007/0254697 A1* | 11/2007 | Sugio | | H04M 1/72538 455/556.2 |
| 2008/0174441 A1* | 7/2008 | Durand | | G08B 21/084 340/573.6 |
| 2008/0311882 A1* | 12/2008 | Schlager | | A61N 1/08 455/404.2 |
| 2009/0167545 A1* | 7/2009 | Osaka | | H04M 1/0274 340/647 |
| 2009/0227300 A1* | 9/2009 | Lee | | H04M 1/0235 455/575.4 |
| 2010/0085216 A1* | 4/2010 | Ms | | G06F 3/043 341/20 |
| 2010/0202368 A1* | 8/2010 | Hans | | H04M 3/5116 370/329 |
| 2010/0267361 A1* | 10/2010 | Sullivan | | G01S 19/17 455/404.2 |
| 2010/0305807 A1* | 12/2010 | Basir | | B60R 16/0373 701/31.4 |
| 2010/0306711 A1* | 12/2010 | Kahn | | G06F 3/017 715/863 |
| 2010/0311475 A1* | 12/2010 | Takatsuka | | H04M 1/0202 455/575.1 |
| 2011/0095914 A1* | 4/2011 | Velado | | B63J 99/00 340/984 |
| 2011/0105100 A1* | 5/2011 | Tanaka | | H01H 13/702 455/418 |
| 2012/0069131 A1* | 3/2012 | Abelow | | G06Q 10/067 348/14.01 |
| 2012/0282884 A1* | 11/2012 | Sun | | H04M 11/04 455/404.2 |
| 2013/0073295 A1* | 3/2013 | Johnson | | G06F 3/162 704/500 |
| 2013/0110319 A1* | 5/2013 | Michelon | | E04H 4/1654 701/2 |
| 2013/0272549 A1* | 10/2013 | Nabata | | H04R 17/00 381/151 |
| 2014/0089243 A1* | 3/2014 | Oppenheimer | | G06F 21/50 706/46 |
| 2014/0253322 A1* | 9/2014 | Chapin | | G08B 1/08 340/539.11 |
| 2014/0266793 A1* | 9/2014 | Velado | | G08B 25/08 340/870.16 |
| 2014/0278229 A1* | 9/2014 | Hong | | A61B 5/7455 702/160 |
| 2014/0355777 A1* | 12/2014 | Nabata | | H04M 1/03 381/71.14 |
| 2015/0030189 A1* | 1/2015 | Nabata | | G10K 11/178 381/190 |
| 2015/0036864 A1* | 2/2015 | Ozasa | | H04R 7/045 381/388 |
| 2015/0117678 A1* | 4/2015 | Miyano | | H04R 7/045 381/151 |
| 2015/0286194 A1* | 10/2015 | Michelon | | E04H 4/1654 700/275 |
| 2015/0317801 A1* | 11/2015 | Bentley | | H04N 7/181 382/107 |
| 2015/0318015 A1* | 11/2015 | Bose | | H04N 7/188 386/248 |
| 2016/0007123 A1* | 1/2016 | Mizuta | | H04M 1/03 381/333 |
| 2016/0034057 A1* | 2/2016 | Ikeda | | H04M 1/03 345/173 |
| 2016/0037251 A1* | 2/2016 | Daniels | | H04R 1/1041 381/74 |
| 2016/0084454 A1* | 3/2016 | Svitak, Sr. | | H02S 20/00 362/183 |
| 2016/0085999 A1* | 3/2016 | Oppenheimer | | G06F 21/50 726/35 |
| 2016/0086108 A1* | 3/2016 | Abelow | | G06Q 10/067 705/7.29 |
| 2016/0094967 A1* | 3/2016 | Sulaiman | | H04M 1/72541 455/404.2 |
| 2016/0110975 A1* | 4/2016 | Oppenheimer | | G06F 21/50 340/572.1 |
| 2016/0146935 A1* | 5/2016 | Lee | | G01S 15/02 367/87 |
| 2016/0203693 A1* | 7/2016 | Wu | | G08B 21/182 340/623 |
| 2016/0292881 A1* | 10/2016 | Bose | | G06K 9/00342 |
| 2016/0322078 A1* | 11/2016 | Bose | | G11B 27/031 |
| 2017/0048609 A1* | 2/2017 | Schnell | | H04R 1/1083 |
| 2017/0076502 A1* | 3/2017 | Chen | | G06T 19/006 |
| 2017/0124852 A1* | 5/2017 | Pauws | | H04L 67/306 |

* cited by examiner

F I G. 1 1
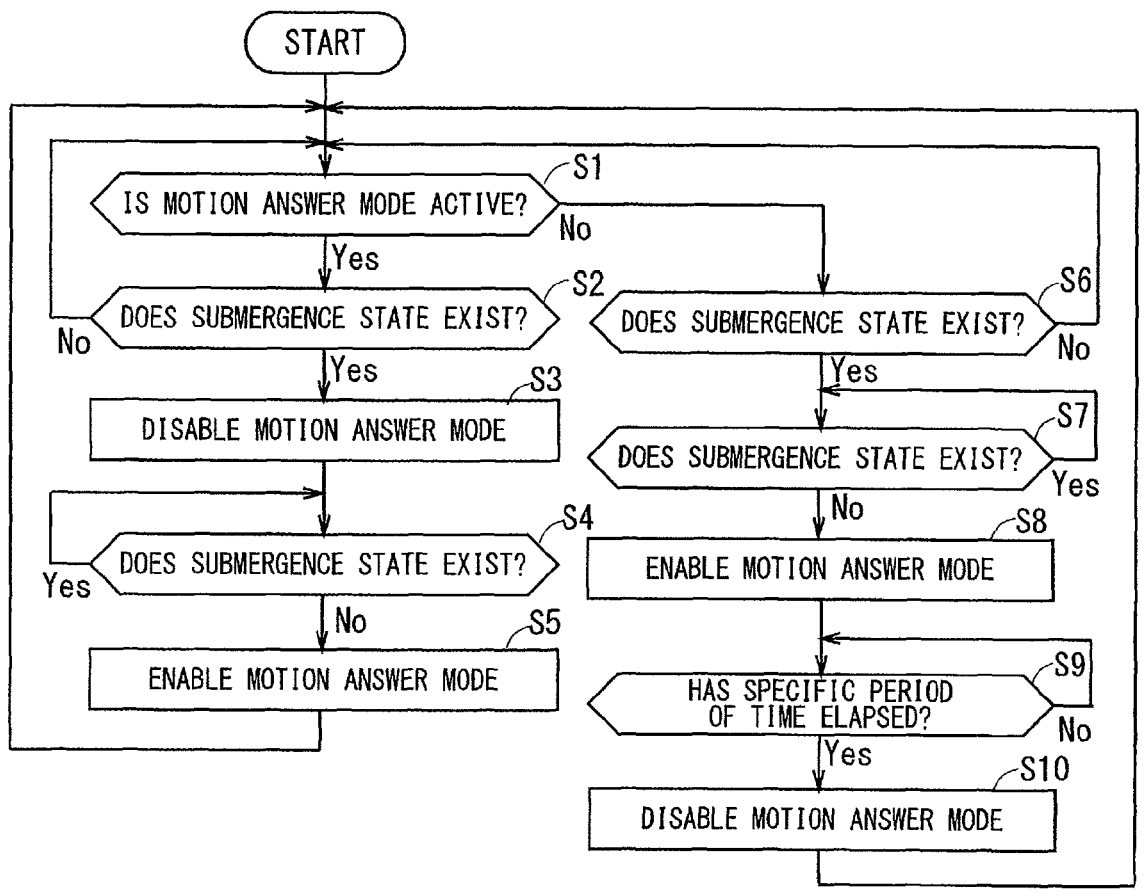

F I G. 1 7
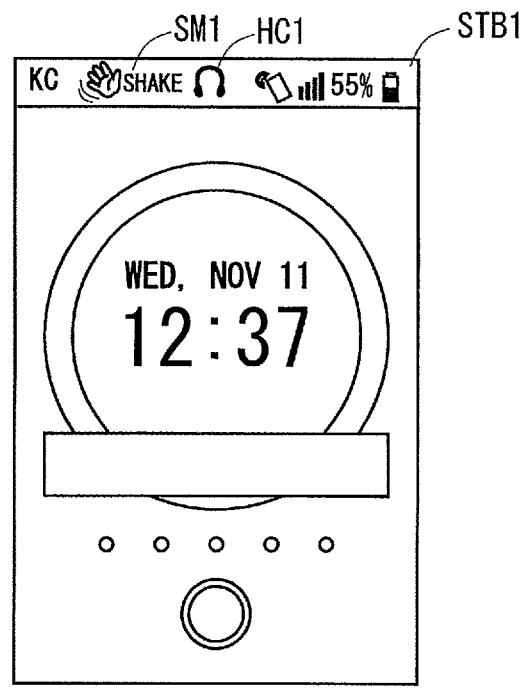
F I G. 1 8
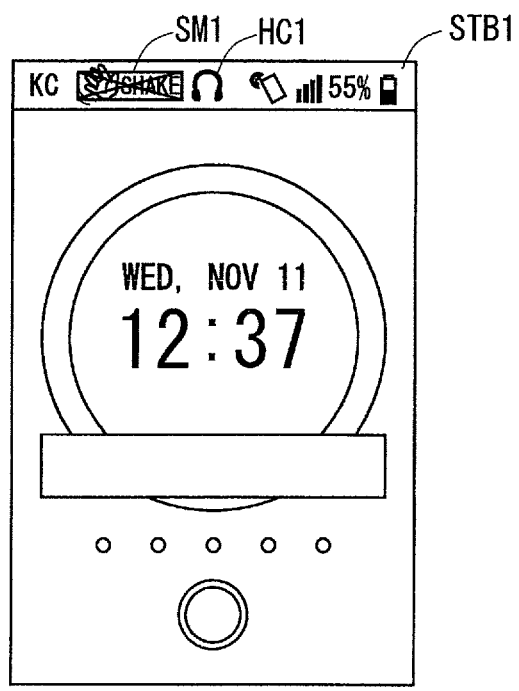

F I G. 2 1
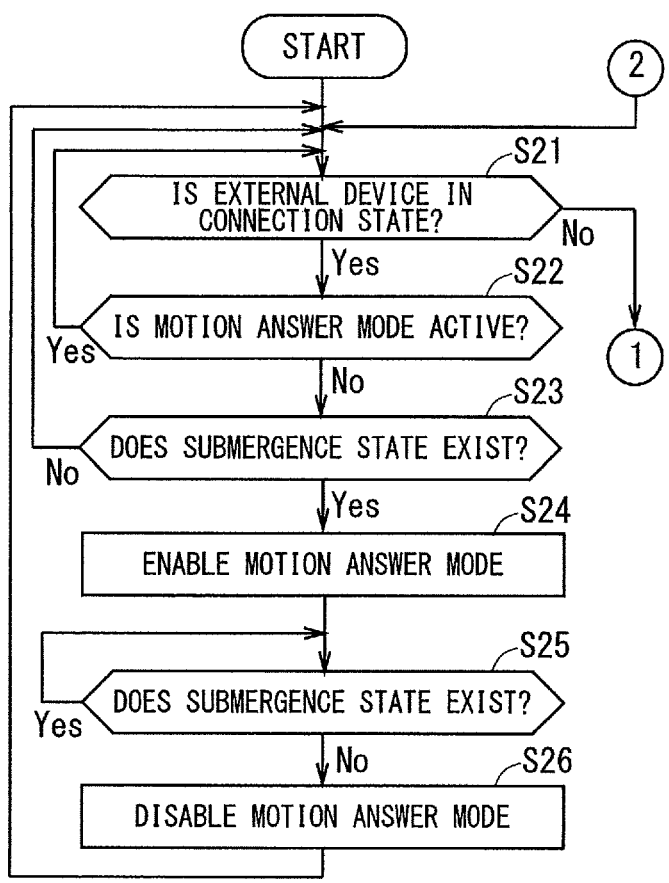

F I G. 2 6
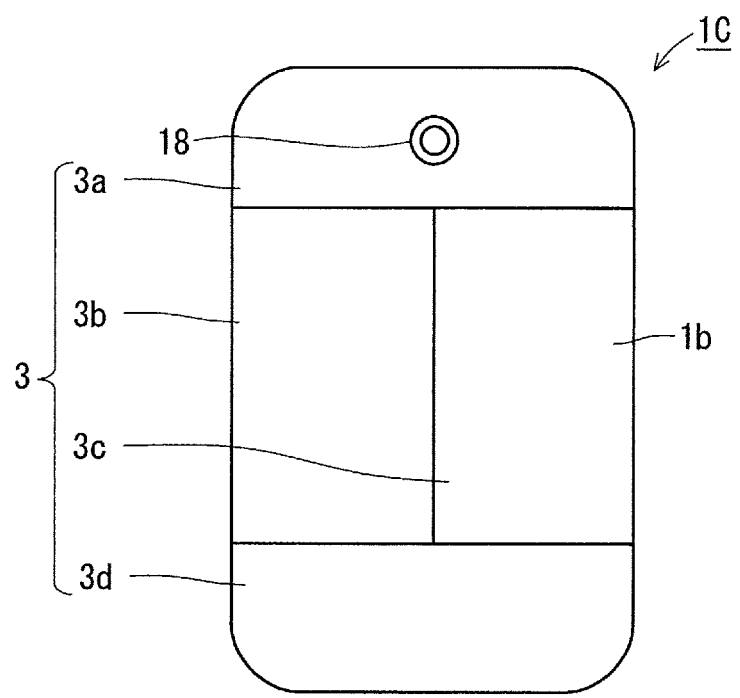

ELECTRONIC APPARATUS AND METHOD FOR CONTROLLING ELECTRONIC APPARATUS

CROSS-REFERENCE TO RELATED APPLICATION

The present application claims priority under 35 U.S.C. §119 to Japanese Patent Application No. 2015-231670, filed on Nov. 27, 2015, entitled "ELECTRONIC APPARATUS, METHOD FOR CONTROLLING ELECTRONIC APPARATUS, CONTROL UNIT OF ELECTRONIC APPARATUS, CONTROL PROGRAM, AND ELECTRONIC APPARATUS SYSTEM". The content of which is incorporated by reference herein in its entirety.

FIELD

Embodiments of the present disclosure relate generally to electronic apparatuses.

BACKGROUND

Various techniques concerning waterproof electronic apparatuses that can be used underwater have been proposed. In some cases, such an electronic apparatus can perform a voice call function for underwater voice call communication when it is located at lesser depths accessible to radio waves.

SUMMARY

An electronic apparatus and a method for controlling an electronic apparatus are disclosed. In one embodiment, an electronic apparatus comprises an apparatus case, at least one processor, a submergence detector, and a motion detector. The at least one processor is configured to receive an incoming call from an external communication apparatus and to perform a voice call with the external communication apparatus. The submergence detector is configured to detect a submergence state in which the apparatus case is located underwater. The motion detector is configured to detect a predetermined specific motion of the apparatus case. The at least one processor controls a setting status of a motion answer mode in which the incoming call is answered and the voice call is accordingly started in response to detection, by the motion detector, of the specific motion. When the submergence state is no longer detected by the submergence detector, the at least one processor enables the motion answer mode.

In one embodiment, an electronic apparatus comprises an apparatus case, at least one processor, a submergence detector, and a motion detector. The at least one processor is configured to receive an incoming call from an external communication apparatus and to perform a voice call with the external communication apparatus. The submergence detector is configured to detect a submergence state in which the apparatus case is located underwater. The motion detector is configured to detect a predetermined specific motion of the apparatus case. The at least one processor controls a setting status of a motion answer mode in which the incoming call is answered and the voice call is accordingly started in response to detection, by the motion detector, of the specific motion. In a case where the at least one processor recognizes a connection state in which an external device including a sound output unit and a microphone unit is communicably connected to the electronic apparatus, when the submergence state is detected by the submergence detector, the at least one processor keeps the motion answer mode that has been enabled in advance active and enables the motion answer mode that has been disabled in advance.

In one embodiment, a method for controlling an electronic apparatus, which is configured to control a setting status of a mode in which an incoming call from an external communication apparatus is answered and a voice call with the external communication apparatus is accordingly started, comprises recognizing that a submergence state in which the electronic apparatus is located underwater is detected. When it is recognized that the submergence state has ceased, a motion answer mode is enabled. The motion answer mode is a mode in which the incoming call is answered and the voice call is accordingly started in response to detection of a predetermined specific motion of the electronic apparatus.

BRIEF DESCRIPTION OF THE DRAWINGS

FIG. 11 illustrates a flowchart showing an example of a series of actions taken to control a setting status of a motion answer mode.

FIG. 17 illustrates example display contents on the display screen.

FIG. 18 illustrates example display contents on the display screen.

FIG. 21 illustrates a flowchart showing an example of a series of actions taken to control the setting status of the motion answer mode.

FIG. 26 illustrates a schematic rear view of an example of the external appearance of the electronic apparatus.

DETAILED DESCRIPTION

Figure 1:
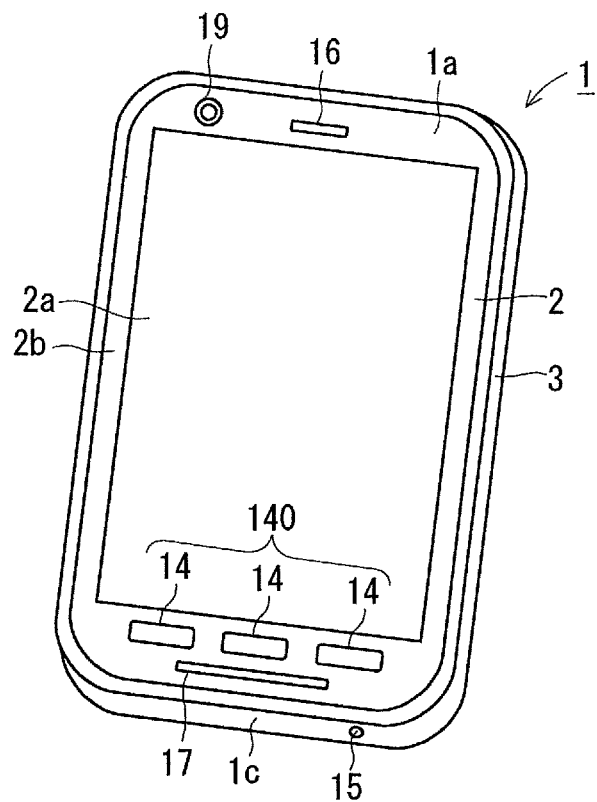
FIG. 1 illustrates a schematic perspective view of an example of an external appearance of an electronic apparatus.

Embodiments of the present disclosure and various modifications thereof will be described below with reference to drawings. In the drawings, the constituent components having similar configurations and functions are denoted by the same reference signs and the description common to these constituent components will not be repeated. Each drawing is merely a schematic illustration, and thus, the size of the individual structure and the positional relation among various structures may be changed as appropriate.

1. One Example of Embodiments 1-1. External Appearance of Electronic Apparatus

Figure 2:
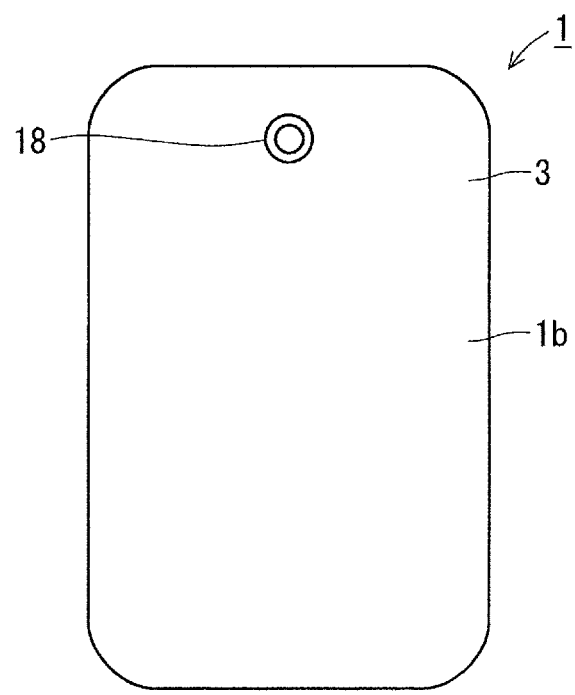
FIG. 2 illustrates a schematic rear view of an example of the external appearance of the electronic apparatus.

FIG. 1 illustrates a schematic perspective view of an example of an external appearance of an electronic apparatus 1. FIG. 2 illustrates a schematic rear view of an example of the external appearance of the electronic apparatus 1. The electronic apparatus 1 is, for example, a "waterproof" mobile phone such as a "waterproof" smartphone. The electronic apparatus 1 can communicate with another communication apparatus via, for example, a base station and a server.

As illustrated in FIGS. 1 and 2, the electronic apparatus 1 includes a cover panel 2 located on a front surface 1a of the electronic apparatus 1 and an apparatus case 3 to which the cover panel 2 is attached. The cover panel 2 and the apparatus case 3 constitute an outer package of the electronic apparatus 1. The electronic apparatus 1 has, for example, an approximately rectangular plate shape in a plan view.

The cover panel 2 includes a display screen 2a on which various types of information such as characters, signs, and graphics displayed by a display panel 121, which will be described below, are displayed. A peripheral part 2b surrounding the display screen 2a in the cover panel 2 is, for example, mostly black because of a film or the like laminated thereon. Most of the peripheral part 2b of the cover panel 2 is a non-display area on which various types of information, which the display panel 121 displays, are not displayed.

Attached to a rear surface of the display screen 2a is a touch panel 130, which will be described below. The display panel 121 is attached to the surface opposite to the surface on the display screen 2a side of the touch panel 130. This means that the display panel 121 is attached to the rear surface of the display screen 2a with the touch panel 130 therebetween. The user can accordingly provide various instructions to the electronic apparatus 1 by operating the display screen 2a with an operator such as a finger. The positional relationship between the touch panel 130 and the display panel 121 is not limited to the relationship described above. For example, part of the configuration of the touch panel 130 may be embedded in the display panel 121 as long as an operation performed on the display screen 2a with an operator can be detected.

As illustrated in FIG. 1, located in an upper end portion of the cover panel 2 is a second-lens transparent part 19 through which a lens of a second camera 190, which will be described below, can be visually recognized from the outside of the electronic apparatus 1. In the upper end portion of the cover panel 2, a receiver hole 16 is provided. In a lower end portion of the cover panel 2, a speaker hole 17 is provided. Additionally, a microphone hole 15 is provided in a bottom surface 1c of the electronic apparatus 1, or, in a bottom surface (a lower side surface) of the apparatus case 3.

As illustrated in FIG. 2, located in a back surface 1b of the electronic apparatus 1, or, in an upper end portion of a back surface of the apparatus case 3 is a first-lens transparent part 18 through which an imaging lens of a first camera 180, which will be described below, can be visually recognized from the outside of the electronic apparatus The apparatus case 3 houses an operation button group 140 including a plurality of operation buttons 14. Each operation button 14 is a hardware button such as a press button. The operation button may also be referred to as an "operation key" or a "key".

Each operation button 14 is exposed from, for example, the lower end portion of the cover panel 2. The user can provide various instructions to the electronic apparatus 1 by operating each operation button 14 with a finger or the like.

The plurality of operation buttons 14 include, for example, a home button, a back button, and a history button. The home button is an operation button for causing a home screen (initial screen) to be displayed on the display screen 2a. The back button is an operation button for switching the display of the display screen 2a to its previous screen. The history button is an operation button for causing a list of applications executed by the electronic apparatus 1 to be displayed on the display screen 2a.

1-2. Electrical Configuration of Electronic Apparatus

Figure 3:
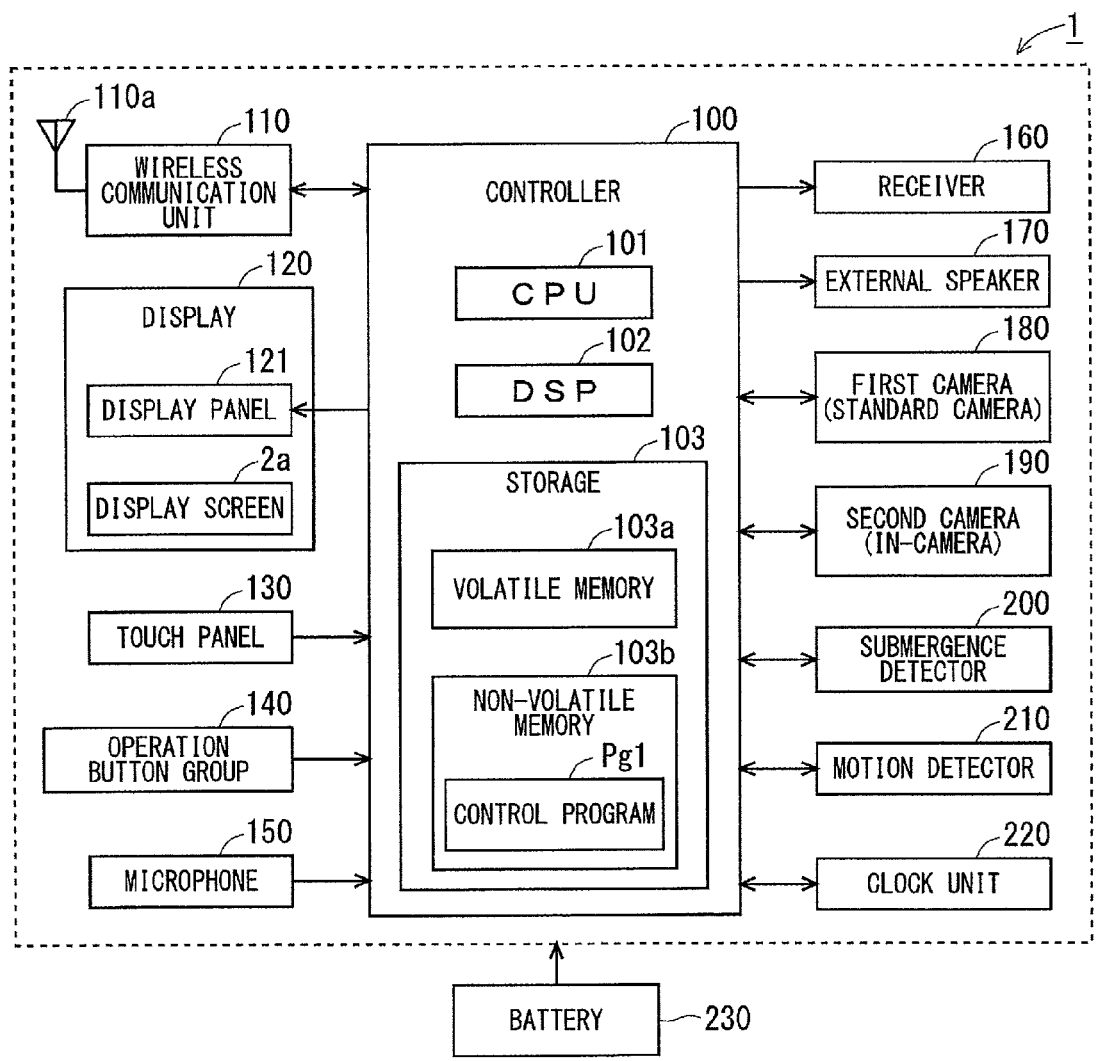
FIG. 3 illustrates an example of an electrical configuration of the electronic apparatus.

FIG. 3 illustrates a block diagram showing an example of an electrical configuration of the electronic apparatus 1. As illustrated in FIG. 3, the electronic apparatus 1 includes a controller 100, a wireless communication unit 110, a display 120, the touch panel 130, the operation button group 140, and a microphone 150. The electronic apparatus 1 further includes a receiver 160, an external speaker 170, the first camera 180, the second camera 190, a submergence detector 200, a motion detector 210, a clock unit 220, and a battery 230. The apparatus case 3 houses these components of the electronic apparatus 1.

The electronic apparatus 1 includes at least one processor for providing control and processing capability to perform various functions as described in further detail below. In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes. In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein. The controller 100 is a kind of an arithmetic processing unit and includes, for example, electric circuits such as a central processing unit (CPU) 101, a digital signal processor (DSP) 102, and a storage 103. The controller 100 can control other constituent components of the electronic apparatus 1 to perform overall control of the operation of the electronic apparatus 1. The electronic apparatus 1 may further include co-processors such as a system-on-a-chip (SoC), a micro control unit (MCU), and a field-programmable gate array (FPGA). The CPU and the co-processors may be used in cooperation or in a selective manner to perform various types of control of the electronic apparatus 1.

The storage 103 includes a non-transitory recording medium readable by the CPU101 and the DSP 102 such as a read only memory (ROM) and a random access memory (RAM). The ROM of the storage 103 is, for example, a flash ROM (flash memory) that is a non-volatile memory 103b. The storage 103 can store, for example, a main program for controlling the electronic apparatus 1 and a plurality of application programs (also merely referred to as "applications" hereinafter). The CPU101 and the DSP 102 execute the various programs stored in the storage 103 to achieve various functions of the controller 100. The storage 103 can store, for example, a call application for performing a voice call and a video call and a camera application for capturing a still image or a video using the first camera 180 or the second camera 190. The applications stored in the storage 103 include, for example, a control program Pg1 for controlling the electronic apparatus 1.

The storage 103 may include a non-transitory computer readable recording medium other than the ROM and the RAM. The storage 103 may include, for example, a compact hard disk drive, a solid state drive (SSD), and the like. All or some of the functions of the controller 100 may be achieved by hardware that needs no software to achieve the functions above.

The wireless communication unit 110 includes an antenna 110a. The wireless communication unit 110 can receive, for example, a signal from a communication apparatus different from the electronic apparatus 1 or a signal from communication equipment such as a web server connected to the Internet through the antenna 110a via a base station. The wireless communication unit 110 can amplify and down-convert the signal received by the antenna 110a and then output a resultant signal to the controller 100. The controller 100 can, for example, demodulate the received signal to acquire information such as a sound signal indicating the voice or music contained in the received signal.

The wireless communication unit 110 can also up-convert and amplify a transmission signal generated by the controller 100 to wirelessly transmit the processed transmission signal from the antenna 110a. For example, the transmission signal from the antenna 110a is received, via the base station, by the mobile phone different from the electronic apparatus 1 or the communication equipment such as the web server connected to the Internet.

The display 120 includes the display panel 121 and the display screen 2a. The display panel 121 is, for example, a liquid crystal panel or an organic electroluminescent (EL) panel. The display panel 121 can display various types of information such as characters, signs, and graphics under the control of the controller 100. The various types of information, which the display panel 121 displays, are displayed on the display screen 2a.

The touch panel 130 is, for example, a projected capacitive touch panel. The touch panel 130 can detect an operation performed on the display screen 2a with the operator such as a finger. When the user performs an operation on the display screen 2a with the operator such as the finger, an electrical signal corresponding to the operation is input from the touch panel 130 to the controller 100. The controller 100 can specify, based on the electrical signal from the touch panel 130, the purpose of the operation performed on the display screen 2a and accordingly perform processing appropriate to the purpose. The user can also provide various instructions to the electronic apparatus 1 by operating the display screen 2a with, for example, a pen for capacitive touch panel such as a stylus pen, instead of the operator such as the finger.

When the user operates each operation button 14 of the operation button group 140, the operation button 14 outputs, to the controller 100, an operation signal indicating that the operation button 14 is operated. The controller 100 can accordingly determine, based on the operation signal from the individual operation button 14, whether the operation button 14 has been operated. The controller 100 can perform the processing corresponding to the operation button 14 that has been operated. Each operation button 14 may be a software button displayed on the display screen 2a, instead of a hardware button such as a press button. In this case, the touch panel 130 can detect an operation performed on the software button, so that the controller 100 can perform the processing corresponding to the software button that has been operated.

The microphone 150 can convert the sound from the outside of the electronic apparatus 1 into an electrical sound signal and then output the electrical sound signal to the controller 100. The sound from the outside of the electronic apparatus 1 is, for example, taken inside the electronic apparatus 1 through, for example, the microphone hole 15 in the bottom surface (lower side surface) of the apparatus case 3 and then is received by the microphone 150.

The external speaker 170 is, for example, a dynamic speaker. The external speaker 170 can convert an electrical sound signal from the controller 100 into a sound and then output the sound. The sound output from the external speaker 170 is, for example, output to the outside of the electronic apparatus 1 through the speaker hole 17 in the lower end portion of the cover panel 2. The sound output through the speaker hole 17 is set to a volume such that the sound can be heard in the place apart from the electronic apparatus 1.

The receiver 160 is, for example, a dynamic speaker. The receiver 160 can convert an electrical sound signal from the controller 100 into a sound and then output the sound. The receiver 160 can output, for example, a received sound. The sound output from the receiver 160 is, for example, output to the outside through the receiver hole 16 in the upper end portion of the cover panel 2. The volume of the sound output through the receiver hole 16 is, for example, set to be lower than the volume of the sound output from the external speaker 170 through the speaker hole 17.

The receiver 160 may be replaced with a piezoelectric vibration element. The piezoelectric vibration element can vibrate based on a sound signal from the controller 100. The piezoelectric vibration element is located on, for example, the rear surface of the cover panel 2. The piezoelectric vibration element can cause, through its vibration based on the sound signal, the cover panel 2 to vibrate. When the user brings the cover panel 2 close to his/her ear, the vibration of the cover panel 2 is transmitted to the user as a voice. The receiver hole 16 is not necessary when the receiver 160 is replaced with the piezoelectric vibration element.

The clock unit 220 can obtain the current time and can also obtain the current date. The clock unit 220 includes a real time clock (RTC) and the like. The clock unit 220 can output, to the controller 100, the time information indicating the obtained time and the date information indicating the obtained date.

The battery 230 can output power for the electronic apparatus 1. The battery 230 is, for example, a rechargeable battery such as a lithium-ion secondary battery. The battery 230 can supply power to various electronic components such as the controller 100 and the wireless communication unit 110 of the electronic apparatus 1.

Each of the first camera 180 and the second camera 190 includes a lens, an image sensor, and the like. The first camera 180 and the second camera 190 can individually image an object under the control of the controller 100, generate a still image or a video showing the imaged object, and then output the still image or the video to the controller 100. The controller 100 can store the received still image or the received video in the non-volatile memory 103b (e.g. flash memory) or the volatile memory 103a (e.g. RAM) of the storage 103.

The lens of the second camera 190 can be visually recognized from the second-lens transparent part 19 in the cover panel 2. The second camera 190 can thus image an object located on the cover panel 2 side of the electronic apparatus 1, or, on the front surface 1a side of the electronic apparatus 1. The second camera 190 above is also referred to as an "in-camera".

The lens of the first camera 180 can be visually recognized from the first-lens transparent part 18 in the back surface 1b of the electronic apparatus 1. The first camera 180 can thus image an object located on the back surface 1b side of the electronic apparatus 1. The first camera 180 is also referred to as an "out-camera".

The submergence detector 200 can detect the state in which the apparatus case 3 is located underwater. That is to say, the state in which the electronic apparatus 1 is located underwater can be detected. This state is also referred to as a "submergence state". For example, the submergence state can arise when the user, who holds the electronic apparatus 1 in the hand, submerges the electronic apparatus 1 in the water. The purpose for submerging the electronic apparatus 1 in the water is, for example, supposedly to capture an image or a video in the water using the first camera 180 and the second camera 190 of the electronic apparatus 1. The submergence detector 200 may include, for example, a pressure sensor and the controller 100. For example, the pressure sensor can measure, through a pressure-sensitive element, the pressure of a gas or a liquid against a member such as a stainless steel diaphragm or a silicon diaphragm, convert the measurement value into an electrical signal, and output the electrical signal to the controller 100. The controller 100 can determine the pressure value based on the electrical signal from the pressure sensor. The controller 100 can detect, based on the determined pressure value, the state in which the apparatus case 3 is located underwater. Specifically, when the determined pressure value exceeds a predetermined threshold, the controller 100 may determine that the apparatus case 3 is located underwater. For example, the pressure value determined by the controller 100 in the state in which the apparatus case 3 is located underwater is measured in advance, and then, the predetermined threshold may be accordingly set to the determined pressure value as required.

Alternatively, the submergence detector 200 may include, for example, the controller 100 and a sensor capable of measuring electrostatic capacity. The sensor capable of measuring electrostatic capacity can measure the electrostatic capacity, convert the measurement value of electrostatic capacity into an electrical signal, and output the electrical signal to the controller 100. The controller 100 can determine the value of electrostatic capacity based on the electrical signal from the sensor capable of measuring electrostatic capacity. For example, the controller 100 can detect, based on the determined value of electrostatic capacity, the state in which the apparatus case 3 is located underwater. The controller 100 may detect the state in which the apparatus case 3 is located underwater when the determined value of electrostatic capacity exceeds a predetermined threshold. For example, the value of electrostatic capacity determined by the controller 100 in the state in which the apparatus case 3 is located underwater is measured in advance, and then, the predetermined threshold may be accordingly set to the measurement value of electrostatic capacity as required. The sensor capable of measuring electrostatic capacity includes, for example, a touch sensor. The touch panel 130 may be used as the sensor capable of measuring electrostatic capacity. Still alternatively, the submergence detector 200 may include the pressure sensor, the sensor capable of measuring electrostatic capacity, the controller 100, and the like.

The motion detector 210 can detect a predetermined specific motion of the apparatus case 3. That is to say, the predetermined specific motion of the electronic apparatus 1 can be detected. The specific motion includes, for example, a motion involving an act of shaking the apparatus case 3. The motion detector 210 may include, for example, an accelerometer and the controller 100. The accelerometer can measure the acceleration generated in the electronic apparatus 1, convert the measurement value of acceleration into an electrical signal, and output the electrical signal to the controller 100. The controller 100 can determine the value of acceleration based on the electrical signal from the accelerometer. The controller 100 can detect, based on the determined value of acceleration, the predetermined specific motion. For example, the controller 100 detects the specific motion when the determined value of acceleration agrees with the value of acceleration associated with the predetermined specific motion. The accelerometer can measure, for example, acceleration along three directions including X, Y, and Z axes.

The specific motion may refer to the movement of the apparatus case 3 along a path that takes on a specific shape. The specific shape is, for example, a circle.

1-3. Configuration of Controller

Figure 4:
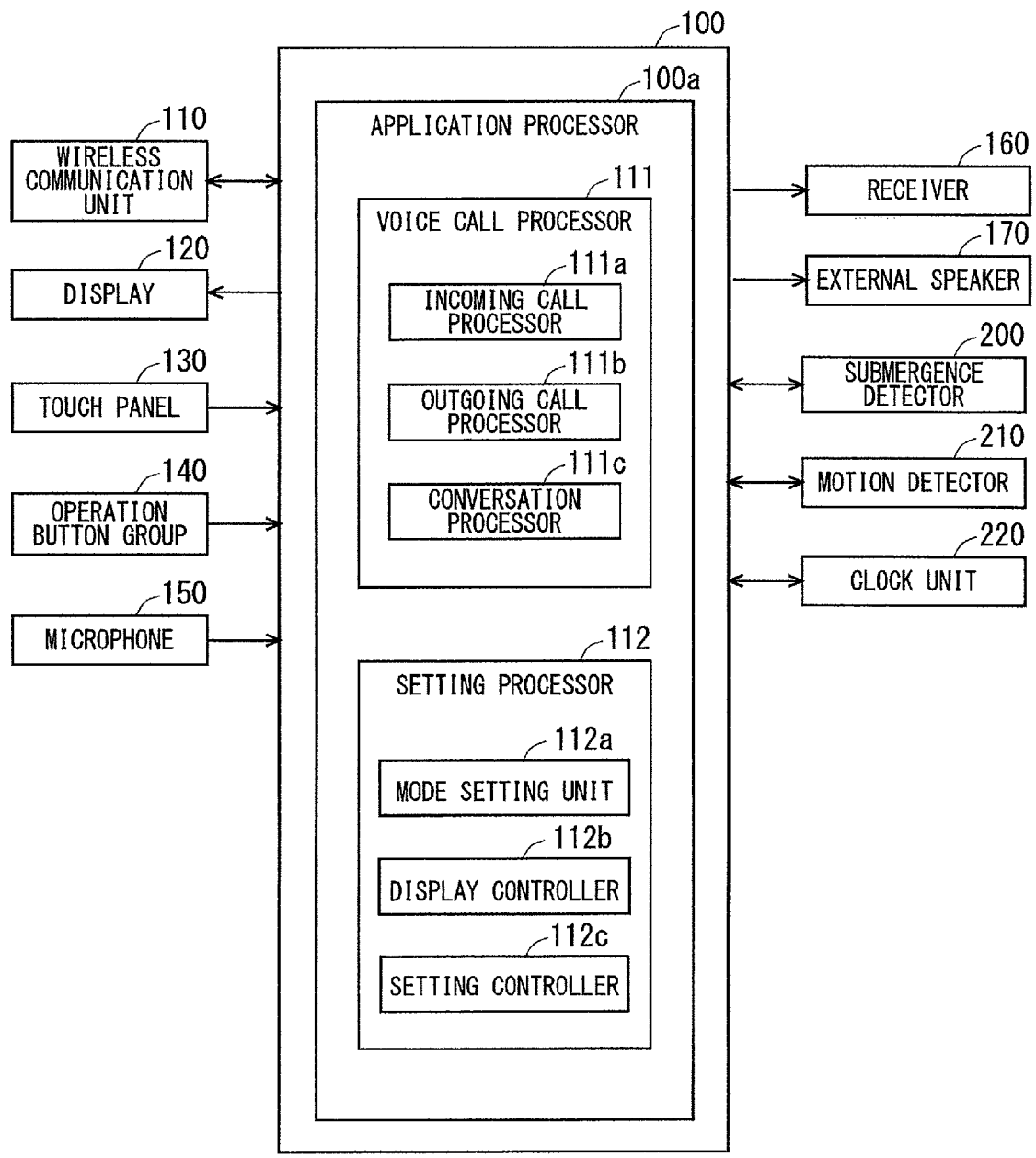
FIG. 4 schematically illustrates an example of an internal configuration of a controller.

FIG. 4 illustrates a functional block diagram schematically showing an example of a configuration of the controller 100. The controller 100 includes an application processor 100a.

The application processor 100a can read and execute, for example, applications stored in the storage 103 to perform various functions of the electronic apparatus 1. The application processor 100a can perform, for example, a voice call function, a web browser function, an email function, or the like. The applications to be executed by the application processor 100a include, for example, the control program Pg1.

The application processor 100a includes a voice call processor 111 and a setting processor 112.

The voice call processor 111 can receive an incoming call from an external communication apparatus and perform a voice call with the external communication apparatus. Similarly to the electronic apparatus 1, the external communication apparatus is, for example, a mobile phone such as a smartphone. Specifically, the voice call processor 111 includes an incoming call processor 111a, an outgoing call processor 111b, and a conversation processor 111c. These functional units may be implemented by software. All or some of these functional units may be hardware.

When receiving an incoming call signal transmitted from a calling party through the wireless communication unit 110, the incoming call processor 111a can notify the user of the incoming call. For example, the incoming call processor 111a can output, to the external speaker 170, a sound signal corresponding to a predetermined ringtone. The external speaker 170 can convert the sound signal into a sound and output the sound.

Figure 5:
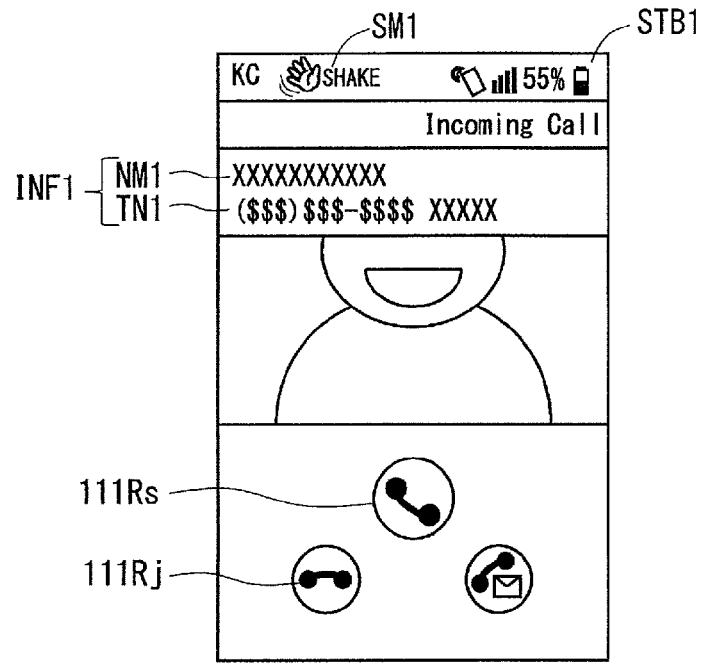
FIG. 5 illustrates example display contents on a display screen.
Figure 6:
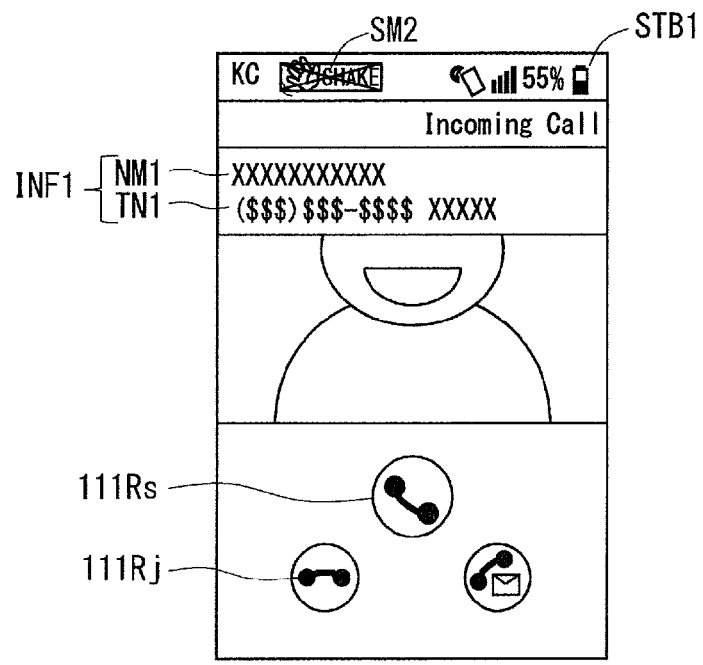
FIG. 6 illustrates example display contents on the display screen.

When receiving the incoming call signal, the incoming call processor 111a can display an incoming call screen on the display 120. Examples of the incoming call screen are as shown in FIGS. 5 and 6. FIG. 5 illustrates an example of displaying, on a status bar STB1, an icon SM1 indicating that a shake answer mode, which will be described below, is active. The status bar STB1, which is located in the uppermost part of the incoming call screen, is a display area on which icons indicating the current status of the electronic apparatus 1 are displayed. FIG. 6 illustrates an example of displaying, on the status bar STB1, an icon SM2 indicating that the shake answer mode is inactive. The incoming call screen above shows information INF1 on the calling party. The information INF1 on the calling party may be any piece of information with which the calling party can be identified. Examples of the information INF1 on the calling party include voice call identification numbers (e.g., telephone numbers) assigned to individual electronic apparatuses. In the illustrations of FIGS. 5 and 6, the identification number of the calling party is denoted by a reference sign TN1. Since the identification number is contained in the incoming call signal, the incoming call processor 111a obtains the identification number of the calling party based on the incoming call signal, and displays the identification number on the display 120.

Information to be displayed as the information INF1 on the calling party may include a name. The storage 103 stores, for example, telephone directory information. The telephone directory information includes a plurality of identification numbers and the names of the users corresponding to the identification numbers. The incoming call processor 111a can obtain the identification number contained in the incoming call signal and then identify the name of the calling party based on the identification number and the telephone directory information. The incoming call processor 111a can accordingly display the name on the display 120. In the illustrations of FIGS. 5 and 6, the name of the calling party is denoted by a reference sign NM1.

The incoming call screen illustrated in each of FIGS. 5 and 6 shows an element 111Rs that functions as an answer button for use in answering an incoming call and an element 111Rj that functions as a rejection button. When the user performs an operation on the element 111Rs or the element 111Rj, the touch panel 130 detects the operation and outputs the detected operation to the incoming call processor 111a. The operation above may be an operation (a "tap operation") in which the user brings an operator close to the element and then moves the operator away from the element. When being brought close to the element, the operator may be in close proximity to the display screen 2a or may be in contact with the display screen 2a. The incoming call processor 111a can start a voice call in response to an operation performed on the element 111Rs and interrupt communication with the calling party in response to an operation performed on the element 111Rj.

The outgoing call processor 111b can transmit, in response to an input of the user, an outgoing call signal to the calling party through the wireless communication unit 110. The outgoing call processor 111b can, for example, display an outgoing call screen (not shown) on the display 120. The outgoing call screen shows, for example, elements that function as the input buttons for use in inputting an identification number and an element that functions as an instruction button for use in originating a call, When the user inputs an identification number and then provides an instruction to originate a call using these elements, the touch panel 130 detects the operations of the user and outputs the operations to the outgoing call processor 111b. The outgoing call processor 111b transmits, in response to the operations, an outgoing call signal to the calling party to which the relevant identification number is assigned. When the calling party answers the call, the outgoing call processor 111b starts a voice call. When the calling party rejects the call, the outgoing call processor 111b interrupts the communication between the user and the calling party.

During a voice call, the conversation processor 111c can output, through the receiver 160 or the like, a sound signal received from the calling party and transmit, to the calling party, a sound signal input through the microphone 150. The user and the calling party can accordingly perform the voice call.

The conversation processor 111c may display a voice call screen (not shown) on the display 120. The voice call screen may show an element that functions as a voice call end button. When the user performs an operation on the element, the touch panel 130 detects the operation and outputs the detected operation to the conversation processor 111c. Upon receipt of the operation, the conversation processor 111c ends the voice call.

Figure 7:
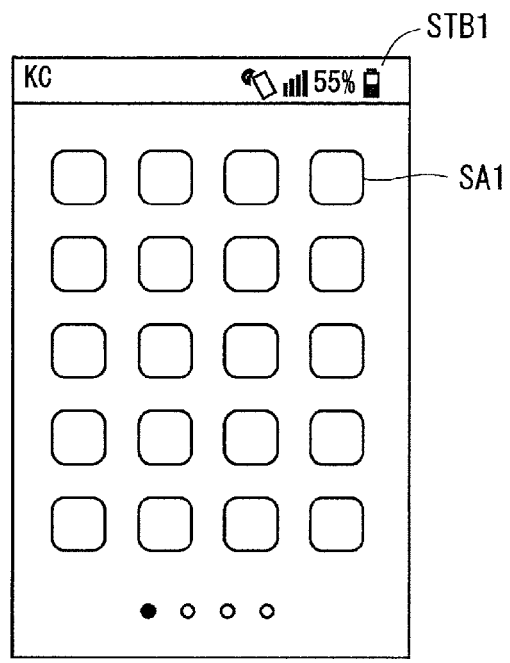
FIG. 7 illustrates example display contents on the display screen.

The setting processor 112 can perform a mode setting processing in which the setting associated with a motion answer mode of the electronic apparatus 1 is performed or altered, in response to an operation of the user or according to the current use of the electronic apparatus 1. The motion answer mode is a mode in which an incoming call is answered and a voice call is accordingly started in response to the detection, by the motion detector 210, of the specific motion. As described above, the specific motion includes, for example, a motion involving the act of shaking the apparatus case 3. In one example, when an application icon SA1 for a mode setting processing is specified on the home screen displayed on the display 120 as illustrated in FIG. 7, the mode control processing is performed. The application icon SA1 is a graphic that corresponds to an application for the mode control processing and is for use in executing the relevant application.

Figure 8:
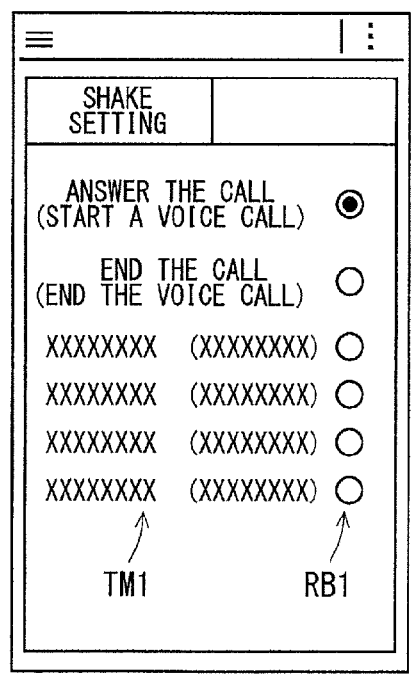
FIG. 8 illustrates example display contents on the display screen.

The setting processor 112 can display a setting screen on the display 120 when the application for the mode setting processing is executed. One example of the setting screen is as shown in FIG. 8. The setting screen is a screen on which the user can perform the setting associated with the processing that is to be executed in response to the detection, by the motion detector 210, of the specific motion. As illustrated in FIG. 8, a list of titles TM1 of various types of processing to be performed in the electronic apparatus 1 may be displayed on the setting screen, where the user can specify, for each title TM1 of the corresponding processing, as to whether to perform the relevant processing in response to the detection of the specific motion. Specifically, for each title TM1 of the corresponding processing, the user may perform an operation, which will be detected by the touch panel 130, on a radio button RB1, thereby specifying as to whether to perform the relevant processing in response to the detection of the specific motion. For example, FIG. 8 illustrates an example of the state in which "Answer the Call (Start a Voice Call)", which is the title of one type of processing, is specified through the use of the radio button RB1. When the title "Answer the Call (Start a Voice Call)" of the processing is specified, the motion answer mode is enabled for the relevant processing.

The state in which the motion answer mode is active refers to the state in which the functions of the motion answer mode are performed properly. In the state in which the motion answer mode is active, when the motion detector 210 detects the specific motion, an incoming call is answered and a voice call is accordingly started. Conversely, the state in which the motion answer mode is not active or the state in which the motion answer mode is inactive refers to the state in which no functions of the motion answer mode are performed properly. In the state in which the motion answer mode is not active or in the state in which the motion answer mode is inactive, when the motion detector 210 detects the specific motion, no incoming call is answered and no voice call is accordingly started.

The setting processor 112 includes a mode setting unit 112a, a display controller 112b, and a setting controller 112c. These functional units may be implemented by software. All or some of these functional units may be hardware.

The mode setting unit 112a can, for example, place the electronic apparatus 1 in the motion answer mode when the user operates the setting screen as mentioned above. The mode setting unit 112a can, under the control of the setting controller 112c, enable or disable the motion answer mode according to the state of the electronic apparatus 1. In one embodiment, the motion answer mode is, for example, a mode (also referred to as a "shake answer mode") in which an incoming call is answered and a voice call is accordingly started in response to the detection, by the motion detector 210, of a motion involving the act of shaking the apparatus case 3. For example, the mode setting unit 112a can cause the storage 103 to store the information on the setting status of the motion answer mode as needed, whereby the information is managed.

Figure 9:
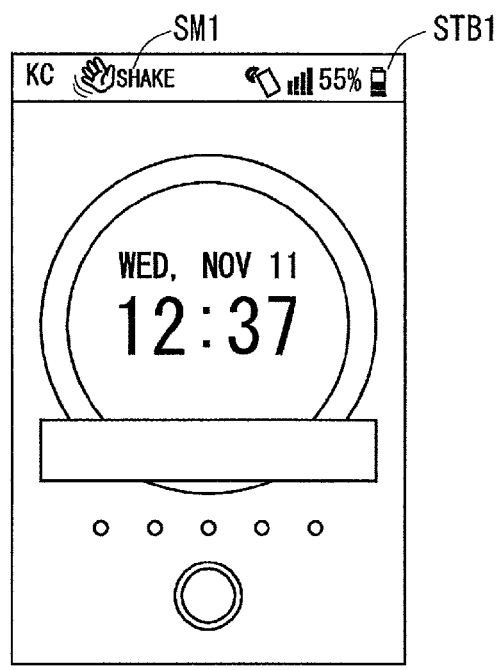
FIG. 9 illustrates example display contents on the display screen.
Figure 10:
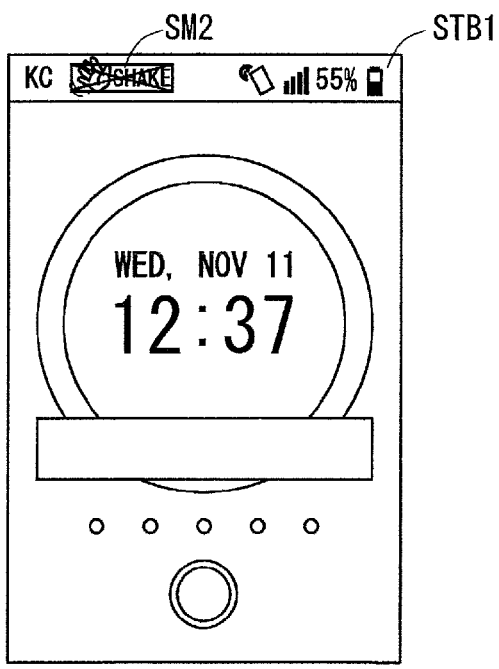
FIG. 10 illustrates example display contents on the display screen.

The display controller 112b can display, on a standby screen or the incoming call screen displayed on the display 120, an element corresponding to the current status of the motion answer mode set by the mode setting unit 112a. Examples of the standby screen above are as shown in FIGS. 9 and 10. As illustrated in FIGS. 5 and 9, when the shake answer mode, which is the motion answer mode, is enabled, the icon SM1 indicating that the shake answer mode is active may be displayed on the status bar STB1. As illustrated in FIGS. 6 and 10, when the shake answer mode is disabled, the icon SM2 indicating that the shake answer mode is inactive may be displayed on the status bar STB1.

The setting controller 112c can control the setting status of a mode in which an incoming call is answered and a voice call is accordingly started. Specifically, the setting controller 112c can control the setting status of the motion answer mode. The setting controller 112c can control the setting status of the motion answer mode in such a manner that the motion answer mode is enabled or disabled according to the current use of the electronic apparatus 1. The current use mentioned above refers to, for example, whether the electronic apparatus 1 including the apparatus case 3 is located underwater (is in the submergence state).

The setting controller 112c can recognize that the submergence detector 200 has detected the submergence state in which the apparatus case 3 is located underwater. For example, when the setting controller 112c receives a specific signal transmitted from the submergence detector 200 that has detected the submergence state, the setting controller 112c can recognize that the submergence state has been detected. For example, the setting controller 112c can also recognize that the submergence state detected by the submergence detector 200 has ceased. For example, when the setting controller 112c no longer receives the specific signal transmitted from the submergence detector 200 that has detected the submergence state, the setting controller 112c can recognize that the submergence state has ceased. Alternatively, when the setting controller 112c receives a specific signal transmitted from the submergence detector 200 that has detected the ceasing of the submergence state, the setting controller 112c may recognize that submergence state has ceased.

The setting controller 112c can obtain the setting status of the motion answer mode at each point in time on an as-needed basis with reference to the information on the setting status of the motion answer mode managed by the mode setting unit 112a.

1-4. Control of Setting Status of Motion Answer Mode

The setting controller 112c can enable the motion answer mode when the submergence state is no longer detected by the submergence detector 200. In a case where the electronic apparatus 1 located underwater receives an incoming call, the user can, upon taking the electronic apparatus 1 out of the water, perform an action on the electronic apparatus 1 so as to cause the specific motion and accordingly answer the incoming call. In the case where the specific motion involves the act of shaking the electronic apparatus 1, the user can readily answer the incoming call and accordingly start a voice call by shaking the electronic apparatus 1 in a manner get the water off the electronic apparatus 1. The following will describe the control of the setting status of the motion answer mode for two cases: one in which the motion answer mode has been enabled in advance in response to an operation of the user and the other one in which the motion answer mode has been disabled in advance in response to an operation of the user.

1-4-1. Example Case in Which Motion Answer Mode Has Been Enabled in Advance In the case where the motion answer mode has been enabled in advance, when the submergence state is detected by the submergence detector 200, the setting controller 112c can disable the motion answer mode. When the electronic apparatus 1 located underwater receives an incoming call, the touch panel 130 can be inhibited from showing unwanted reaction to an act of moving the electronic apparatus 1 through the water surface to the atmosphere. Thus, the user can avoid answering the incoming call inadvertently. That is to say, the user can start answering the incoming call at the time of his/her choice.

When the setting controller 112c disables the motion answer mode in response to the detection, by the submergence detector 200, of the submergence state, and then, when such submergence state is no longer detected by the submergence detector 200, the setting controller 112c can enable the motion answer mode. When the electronic apparatus 1 located underwater receives an incoming call, the user can answer the incoming call by taking the electronic apparatus 1 out of the water and performing an action on the electronic apparatus 1 so as to cause the specific motion. In the case where the specific motion is a motion involving the act of shaking the electronic apparatus 1, the user can readily answer the incoming call and accordingly start a voice call by shaking the electronic apparatus 1 so as to get the water off the electronic apparatus 1.

When the motion answer mode is temporarily disabled due to the submergence of the electronic apparatus 1, the display controller 112b may display, on the status bar STB1, an element indicating that the motion answer mode is inactive. For example, as illustrated in FIGS. 6 and 10, the icon SM2 indicating that the shake answer mode is inactive is displayed on the status bar STB1. When the electronic apparatus 1 is located underwater, the reception of an incoming call may be displayed on the display 120 in written form. This can prompt the user to decide whether to answer the incoming call and to start a voice call by taking the electronic apparatus 1 out of the water.

1-4-2. Example Case in Which Motion Answer Mode Has Been Disabled in Advance In the case where the motion answer mode has been disabled in advance, when such submergence state is no longer detected by the submergence detector 200, the setting controller 112c can enable the motion answer mode and keep the motion answer mode active over a predetermined specific period of time. The specific period of time can be set to a length long enough for the user, who has taken the electronic apparatus 1 out of the water, to decide whether to answer the incoming call and to start a voice call. Specifically, the specific period of time can be set to a length ranging from about several seconds to about several tens of seconds. When the electronic apparatus 1 located underwater receives an incoming call, the user can answer the incoming call by taking the electronic apparatus 1 out of the water and performing the action on the electronic apparatus 1 so as to cause the specific motion. The elapsed time within the specific period of time can be managed based on the information indicating the current time obtained by the clock unit 220.

When the electronic apparatus 1 is taken out of the water, and then, when the motion answer mode is accordingly enabled for the time being, the display controller 112b may display, on the status bar STB1, an element indicating that the motion answer mode is active. For example, as illustrated in FIGS. 5 and 9, the icon SM1 indicating that the shake answer mode is active is displayed on the status bar STB1. The user can cause the specific motion in a manner to get the water off the electronic apparatus 1, thereby readily answering the incoming call to start a voice call.

The setting controller 112c can disable the motion answer mode after a lapse of the specific period of time since the submergence state is no longer detected by the submergence detector 200. The electronic apparatus 1 can be accordingly placed back in the original mode specified by the user in advance. The user can answer the incoming call by performing the operation of his/her choice.

1-5. Example of a Series of Actions Taken to Control Setting Status of Motion Answer Mode The following will describe a method for controlling the electronic apparatus 1, namely, a series of actions taken to control the setting status of the motion answer mode. FIG. 11 illustrates a flowchart showing an example of a series of actions taken by the setting controller 112c to control the setting status of the motion answer mode. These actions taken to control the setting status of the motion answer mode may be achieved by executing the control program Pg1 by the controller 100.

In Step S1 of FIG. 11, it is determined whether the motion answer mode is active. If the motion answer mode is active, the process proceeds to Step S2. If the motion answer mode is not active, the process proceeds to Step S6. Specifically, if the motion answer mode is active, the processing in Steps S2 to S5 is performed. If the motion answer mode is inactive, the processing in Steps S6 to S10 is performed.

In Step S2, it is determined whether the submergence state exists. For example, the setting controller 112c can recognize that the submergence detector 200 has detected the submergence state in which the apparatus case 3 is located underwater. If no such submergence state exists, the process returns to Step S1. If the submergence state exists, the process proceeds to Step S3.

In Step S3, the motion answer mode is disabled. This can help the user to avoid answering an incoming call inadvertently.

In Step S4, it is determined whether the submergence state exists. For example, the setting controller 112c can recognize whether the submergence , state detected by the submergence detector 200 has ceased. The processing of Step S4 may be repeated until the submergence state ceases. When the submergence state ceases, the process may proceed to Step S5.

In Step S5, the motion answer mode is enabled. Specifically, if the setting controller 112c recognizes that the submergence state detected by the submergence detector 200 has ceased, the setting controller 112c enables the motion answer mode. When the processing of Step S5 is completed, the process returns to Step S1.

In Step S6, it is determined whether the submergence state exists. If no such submergence state exists, the process may return to Step S1. If the submergence state exists, the process may proceed to Step S7.

In Step S7, it is determined whether the submergence state exists. If the submergence state exists, the processing of Step S7 may be repeated. If no such submergence state exists, the process may proceed to Step S8.

In Step S8, the motion answer mode is enabled. Specifically, when the setting controller 112c recognizes that the submergence state detected by the submergence detector 200 has ceased, the setting controller 112c enables the motion answer mode. The user can cause the specific motion in a manner to get the water off the electronic apparatus 1, thereby readily answering the incoming call to start a voice call.

In Step S9, it is determined whether the specific period of time has elapsed. The processing of Step S9 may be repeated until the specific period of time elapses. After a lapse of the specific period of time, the process may proceed to Step S10.

In Step S10, the motion answer mode is disabled. Consequently, the electronic apparatus 1 can be placed back in the original mode specified by the user in advance. Then, the process returns to Step S1.

1-6. Example of a Series of Incoming Call Answering Actions Taken According to Setting Status of Motion Answer Mode The voice call processor 111 can take a series of actions to receive an incoming call, to answer the incoming call, and to start a voice call (hereinafter also referred to as "incoming call answering actions") according to the setting status of the motion answer mode. For example, the operation for answering the incoming call to start a voice call can be changed according to the status of the motion answer mode set by the setting processor 112.

Figure 12:
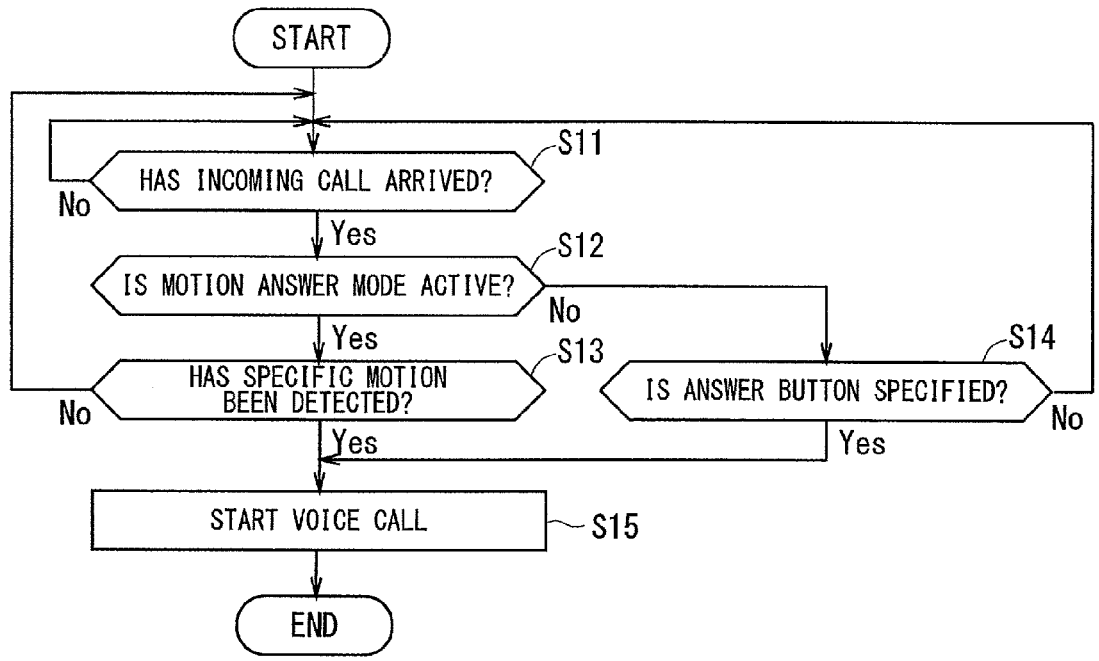
FIG. 12 illustrates a flowchart showing an example of a series of incoming call answering actions.

FIG. 12 illustrates a flowchart showing an example of a series of incoming call answering actions taken by the voice call processor 111.

In Step S11 of FIG. 12, it is determined whether an incoming call from an external communication apparatus has arrived. The processing of Step 11 is repeated until the arrival of the incoming call from the external communication apparatus is determined based on the receipt of an incoming call signal transmitted from the external communication apparatus. If it is determined, based on the receipt of the incoming call signal transmitted from the external communication apparatus, that the incoming call from the external communication apparatus has arrived, the process proceeds to Step S12.

In Step S12, it is determined whether the motion answer mode is active. If the motion answer mode is active, the process proceeds to Step S13. If the motion answer mode is inactive, the process proceeds to Step S14.

In Step S13, it is determined whether the predetermined specific motion of the apparatus case 3 has been detected by the motion detector 210. If the specific motion has not been detected, the process returns to Step S11. If the specific motion has been detected, the process proceeds to Step S15.

In Step S14, it is determined whether the answer button is specified. If the answer button is not specified, the process returns to Step S11. If the answer button is specified, the process proceeds to Step S15.

In Step S15, the incoming call is answered and a voice call is accordingly started. When the processing of Step S15 is performed, the incoming call answering actions are ended. As for the electronic apparatus 1 in the above description, when the electronic apparatus 1 including the apparatus case 3 is located underwater, and then, when the electronic apparatus 1 is taken out of the water, the motion answer mode is enabled. This enables the user, who may move the electronic apparatus 1 through the water surface when the electronic apparatus 1 located underwater receives an incoming call, to avoid inadvertently answering the incoming call. The user can accordingly start answering the incoming call at the time of his/her choice. The user can answer the incoming call and start a voice call accordingly through, for example, the simple act of moving the electronic apparatus 1.

2. Another Example of Embodiments

In one embodiment, an external device including a sound output unit and a microphone unit can be connected to the electronic apparatus, so that the setting status of the motion answer mode is controlled in a different manner.

2-1. External Appearance of Electronic Apparatus System

Figure 13:
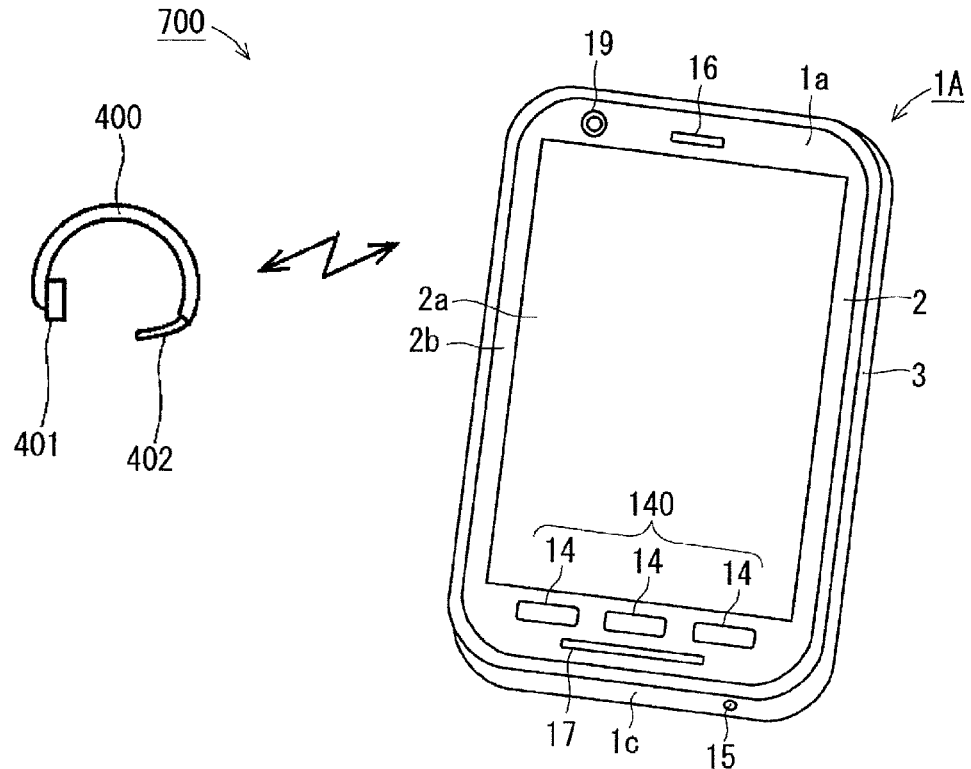
FIG. 13 illustrates a schematic perspective view of an example of an external appearance of an electronic apparatus system.

FIG. 13 illustrates a schematic perspective view of an example of an external appearance of an electronic apparatus system 700. As illustrated in FIG. 13, the electronic apparatus system 700 includes an electronic apparatus 1A and an external device 400.

Figure 14:
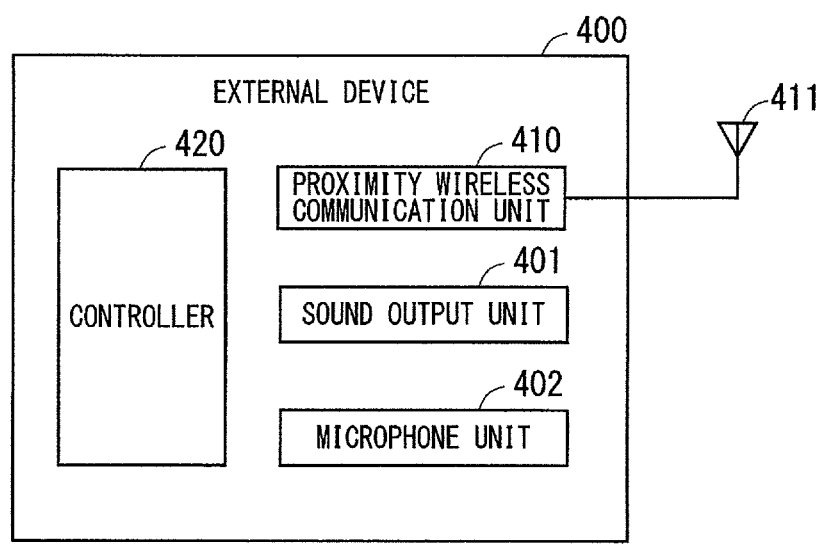
FIG. 14 illustrates an example of an electrical configuration of an external device.

FIG. 14 illustrates an example of an electrical configuration of the external device 400. The external device 400 includes a proximity wireless communication unit 410, a sound output unit 401, a microphone unit 402, and a controller 420. The external device 400 may be a headset to be worn on the user's head. Another example of the external device 400 may be a device such as a portable music player.

The controller 420 can perform overall control of the external device 400. The proximity wireless communication unit 410 can be connected to the electronic apparatus 1A in a manner to transmit and receive data to and from the electronic apparatus 1A.

The proximity wireless communication unit 410 includes an antenna 411 so as to wirelessly communicate with the electronic apparatus 1A. The method of communication may be close proximity wireless communication in which communication can be established between devices located within a short distance. The proximity wireless communication unit 410 can, for example, receive a sound signal from the electronic apparatus 1A. The sound output unit 401 can output a sound corresponding to the sound signal. The sound output unit 401 may be a speaker such as an earphone. The microphone unit 402 can convert a voice of the user into a sound signal. The external device 400 can output the sound signal to the electronic apparatus 1 through the proximity wireless communication unit 410. This configuration enables the user to perform a voice call using the external device 400.

Figure 15:
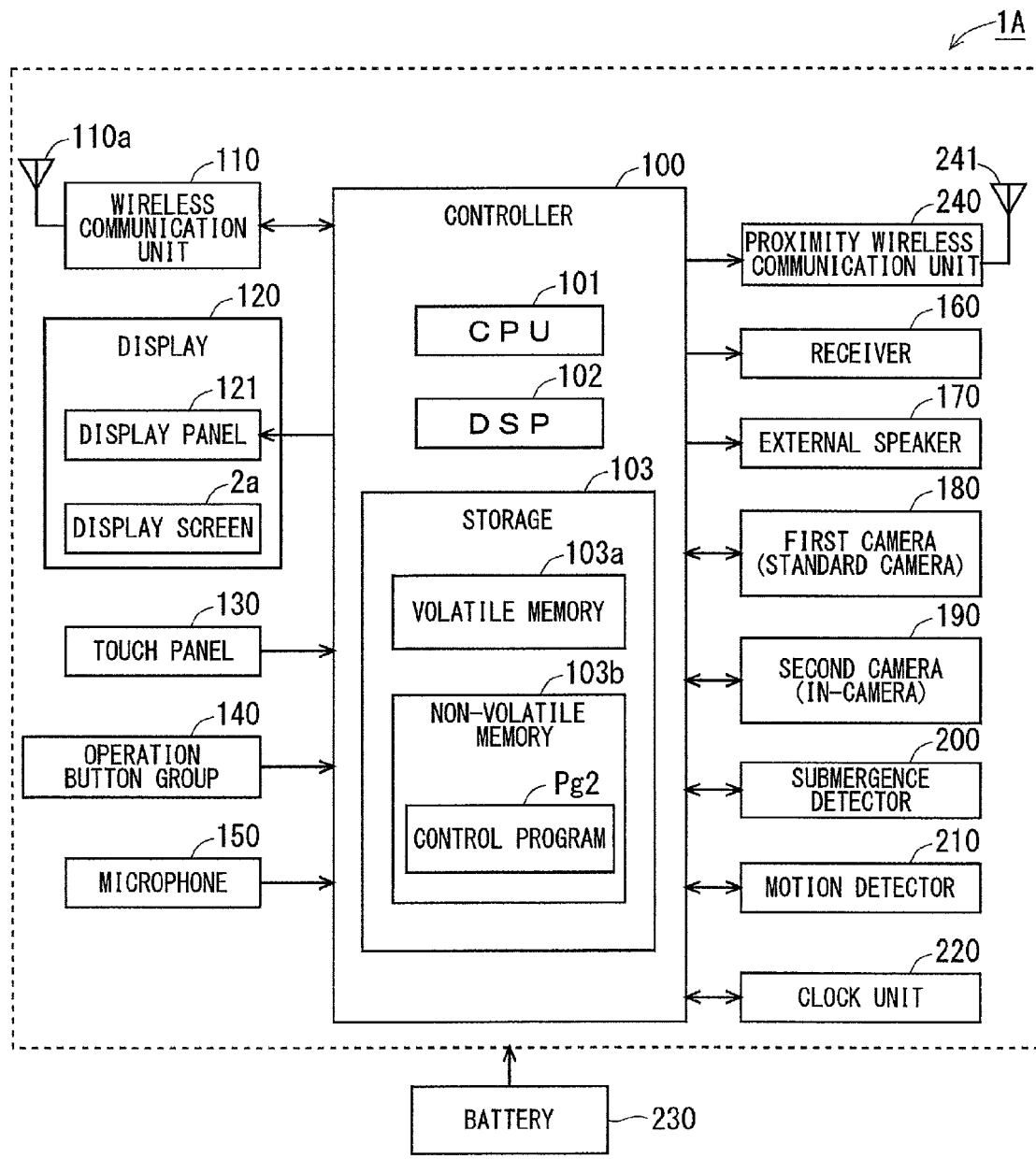
FIG. 15 illustrates an example of the electrical configuration of the electronic apparatus.

FIG. 15 illustrates an example of an electrical configuration of the electronic apparatus 1A. The electronic apparatus 1A includes a control program Pg2 in place of the control program Pg1 and also includes a proximity wireless communication unit 240 in addition to other constituent components of the electronic apparatus 1 mentioned above. The proximity wireless communication unit 240 can conduct, through an antenna 241, communication with a communication terminal that is closer to the electronic apparatus 1A than the communication target of the wireless communication unit 110 (e.g., a base station) is. For example, the proximity wireless communication unit 240 can wirelessly communicate with the external device 400 through the antenna 241. The proximity wireless communication unit 240 can conduct communication according to the Bluetooth (registered trademark) standard or the like.

The external device 400 and the electronic apparatus 1A can wirelessly communicate with each other. Unlike wired communication, a voice call performed through the use of the external device 400 permits free use of the space between the external device 400 and the electronic apparatus 1A.

The external device 400 may include a notification unit. In this case, the voice call processor 111 may notify the external device 400 of an incoming call and then the notification unit of the external device 400 may send the notice to the user.

2-2. Example Configuration of Controller

Figure 16:
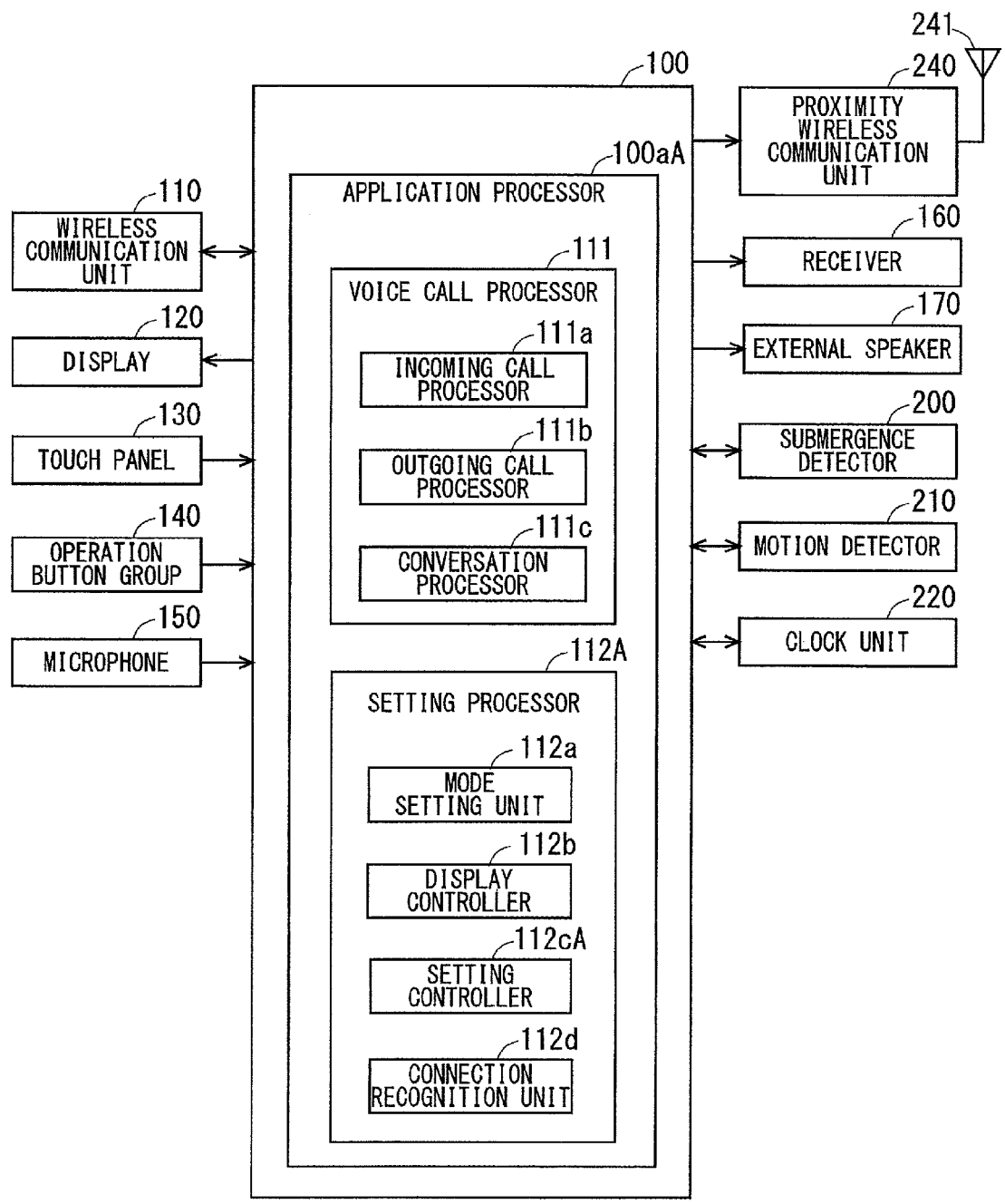
FIG. 16 schematically illustrates an example of the internal configuration of the controller.

FIG. 16 illustrates a functional block diagram schematically showing an example configuration of the controller 100 of the electronic apparatus 1A. Unlike the controller 100 of the electronic apparatus 1 mentioned above, the controller 100 of the electronic apparatus 1A has an additional function of detecting the state in which the external device 400 is connected to the electronic apparatus 1A.

Specifically, the controller 100 of the electronic apparatus 1A includes an application processor 100aA, which serves as an extension of the application processor 100a of the electronic apparatus 1 mentioned above and substitutes a setting processor 112A for the setting processor 112. The setting processor 112A, which serves as an extension of the setting processor 112, substitutes a setting controller 112cA for the setting controller 112c and further includes a connection recognition unit 112d. The application processor 100aA of the controller 100 can read the control program Pg2 form the storage 103 and execute the control program Pg2, whereby the functional configuration of the controller 100 can be changed as described above.

The connection recognition unit 112d can detect the state in which the external device 400 is communicably connected to the electronic apparatus 1A. This state is referred to as a "connection state". The connection recognition unit 112d can recognize the connection state with reference to, for example, information on a communication terminal which is communicably connected to the electronic apparatus 1A through the proximity wireless communication unit 240.

2-3. Control of Setting Status of Motion Answer Mode

2-3-1. Example Case in Which External Device is Connected

In a case where the connection state is recognized by the connection recognition unit 112d, when the submergence state is detected by the submergence detector 200, the setting controller 112cA keeps the motion answer mode that has been enabled in advance active. Also, in the case where the connection state is recognized by the connection recognition unit 112d, when the submergence state is detected by the submergence detector 200, the setting controller 112cA enables the motion answer mode of the electronic apparatus 1A that has been disabled in advance. If the external device 400 such as a headset is connected to the electronic apparatus 1A, the user can perform a voice call using the headset without the need to take the electronic apparatus 1A out of the water. When the electronic apparatus 1A is located underwater, the user can cause the specific motion in a manner to perform a simple operation, thereby readily answering the incoming call to start a voice call. The user can thus start answering the incoming call at the time of his/her choice.

The standby screen and the incoming call screen displayed on the display 120 may show not only the elements corresponding to the current status of the motion answer mode set by the mode setting unit 112a but also an element corresponding to the connection state in which the external device 400 is communicably connected to the electronic apparatus 1A.

Figure 19:
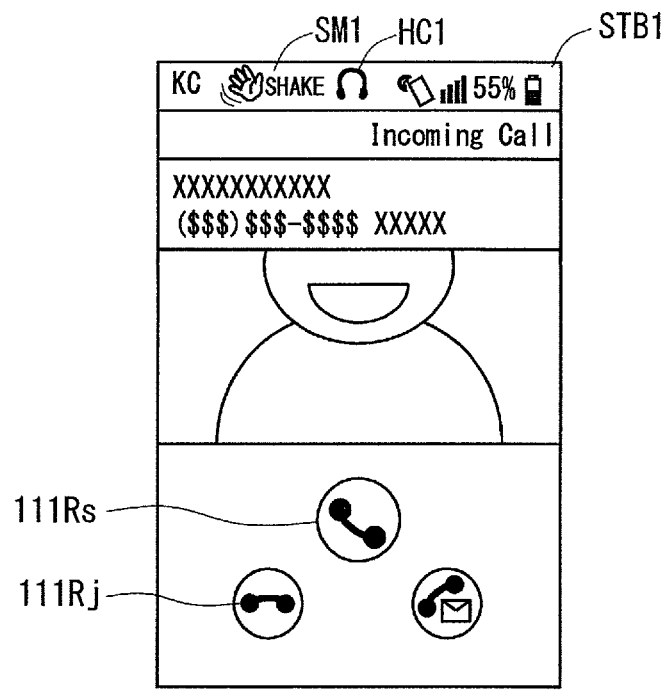
FIG. 19 illustrates example display contents on the display screen.
Figure 20:
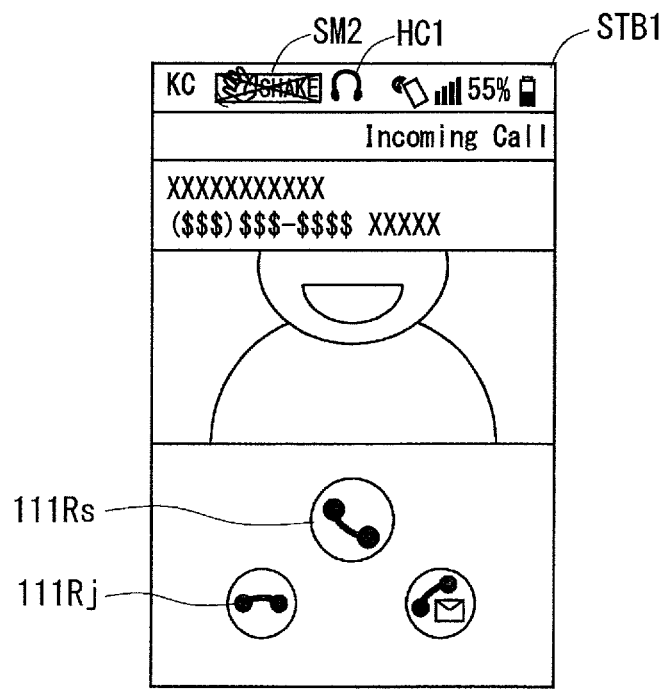
FIG. 20 illustrates example display contents on the display screen.

Examples of the standby screen above are as shown in FIGS. 17 and 18. Examples of the incoming call screen above are as shown in FIGS. 19 and 20. As illustrated in FIGS. 17 to 20, when the external device 400 is communicatively connected to the electronic apparatus 1A, an icon HC1 indicative of the connection state can be displayed on the status bar STB1. As illustrated in FIGS. 17 and 19, when the shake answer mode, which is the motion answer mode, is active, the icon SM1 indicating that the shake answer mode is active can be displayed on the status bar STB1. As illustrated in FIGS. 18 and 20, when the shake answer mode is inactive, the icon SM2 indicating that that the shake answer mode is inactive can be displayed on the status bar STB1.

2-3-2. Example Case in Which Motion Answer Mode Has Been Enabled in Advance In the case where the connection state is recognized by the connection recognition unit 112d, when the submergence state is detected by the submergence detector 200, the setting controller 112cA can keep the motion answer mode that has been enabled in advance active. If the external device 400 such as a headset is communicably connected to the electronic apparatus 1A, the user can perform a voice call without the need to take the electronic apparatus 1A out of the water. When the electronic apparatus 1A is located underwater, the user can cause the specific motion in a manner to perform a simple operation, thereby readily answering the incoming call to start a voice call. The user can thus start answering the incoming call at the time of his/her choice.

2-3-3. Example Case in Which Motion Answer Mode Has Been Disabled in Advance In the case where the motion answer mode has been disabled in advance, when the connection state is recognized by the connection recognition unit 112d and the submergence state is detected by the submergence detector 200, the setting controller 112cA can place the electronic apparatus 1A in the motion answer mode. When the electronic apparatus 1A is located underwater, the user who has noticed the arrival of an incoming call has to take the electronic apparatus 1A out of the water and shake off water droplets in order to answer the incoming call and to start a voice call. This would complicate the process of answering the incoming call and starting a voice call. Meanwhile, the external device 400 such as a headset connected to the electronic apparatus 1A enables the user to perform a voice call without the need to take the electronic apparatus 1A out of the water. When the electronic apparatus 1A is located underwater, the user can cause the specific motion in a manner to perform a simple operation, thereby readily answering the incoming call to start a voice call. The user can accordingly start answering the incoming call at the time of his/her choice.

Alternatively, in the case where the motion answer mode has been disabled in advance, when the connection state is recognized by the connection recognition unit 112d and the submergence state is detected by the submergence detector 200, the setting controller 112cA may keep the motion answer mode inactive. In this case, when such submergence state is no longer detected by the submergence detector 200, the setting controller 112cA may place the electronic apparatus 1A in the motion answer mode for a predetermined specific period of time. After a lapse of the specific period of time, the motion answer mode is disabled.

Concrete examples of the specific period of time and the management associated with the specific period of time may be as in the electronic apparatus 1 mentioned above. In this configuration, in the case where the electronic apparatus 1A located underwater receives an incoming call, the user can, upon taking the electronic apparatus 1A out of the water, perform an action on the electronic apparatus 1A so as to cause the specific motion and accordingly answer the incoming call. In the case where the specific motion involves the act of shaking the electronic apparatus 1A, the user can readily answer the incoming call and accordingly start a voice call by shaking the electronic apparatus 1A in a manner to get the water off the electronic apparatus 1A. Still alternatively, in the case where the motion answer mode has been disabled in advance, when the submergence state is detected by the submergence detector 200, the setting controller 112cA may keep the motion answer mode inactive, regardless of whether the connection state is recognized by the connection recognition unit 112d. In this case, when such submergence state is no longer detected by submergence detector 200, the setting controller 112cA may place the electronic apparatus 1A in the motion answer mode for a predetermined specific period of time. After a lapse of the specific period of time, the motion answer mode is disabled.

In this configuration as well, when the electronic apparatus 1A located underwater receives an incoming call, the user can, upon taking the electronic apparatus 1A out of the water, perform an action on the electronic apparatus 1A so as to cause the specific motion and accordingly answer the incoming call. The user can readily answer the incoming call and accordingly start a voice call by shaking the electronic apparatus 1A in a manner to get the water off the electronic apparatus 1A.

2-4. Example of a Series of Actions Taken to Control Setting Status of Motion Answer Mode The following will describe a method for controlling the electronic apparatus 1A, namely, a series of actions taken to control the setting status of the motion answer mode.

Figure 22:
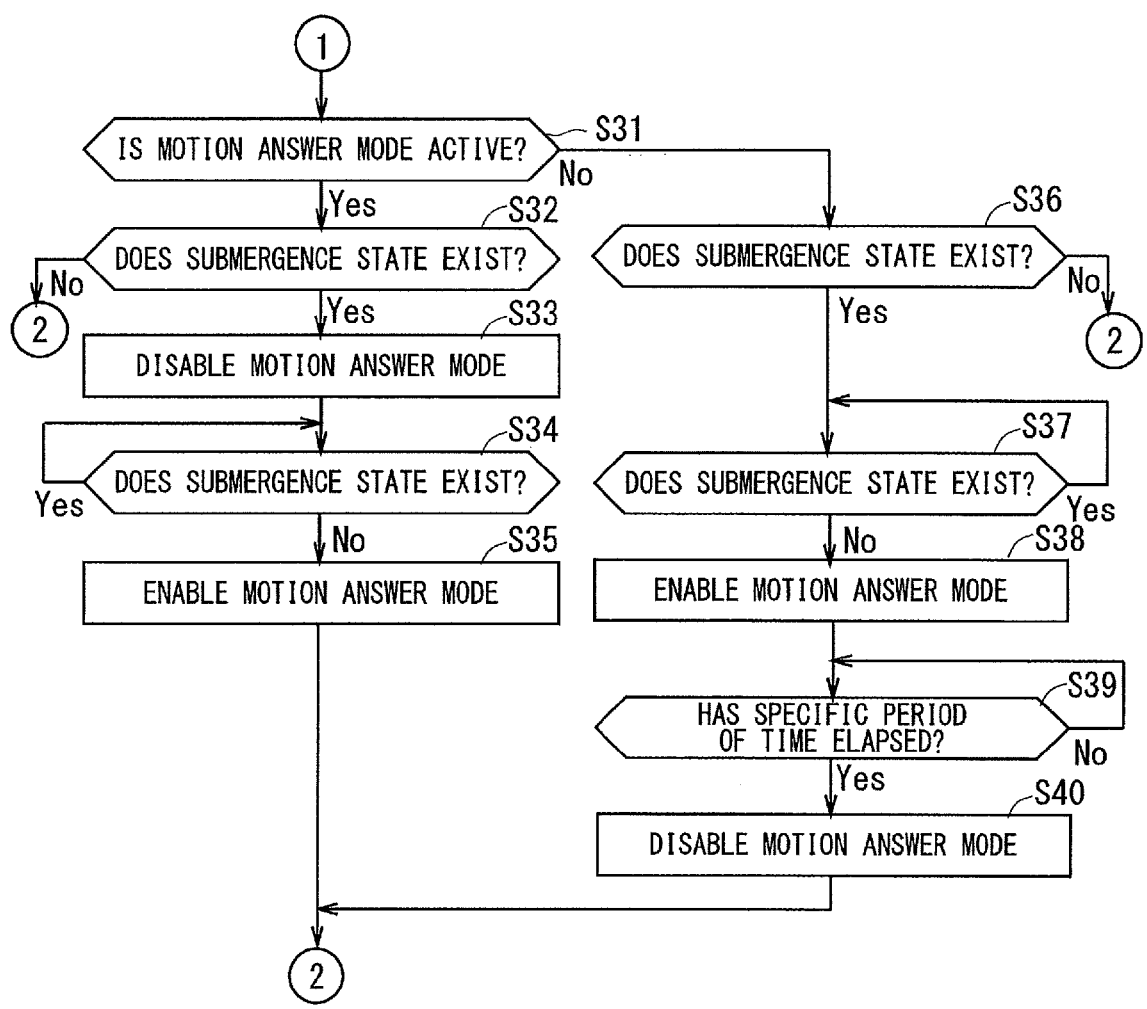
FIG. 22 illustrates a flowchart showing an example of a series of actions taken to control the setting status of the motion answer mode.

FIGS. 21 and 22 illustrate flowcharts each showing an example of a series of actions taken by the setting controller 112cA to control the setting status of the motion answer mode. These actions taken to control the setting status of the motion answer mode may be achieved by executing the control program Pg2 by the controller 100.

In Step S21 of FIG. 21, it is determined whether the connection state, in which the external device 400 is communicably connected to the electronic apparatus 1A, exists. The connection state above can be recognized by the connection recognition unit 112d. If the connection state exists, the process proceeds to Step S22. If no such connection state exists, the process proceeds to Step S31 of FIG. 22. Specifically, if the connection state exists, the processing of Steps S22 to S26 of FIG. 21 is performed. If no such connection state exists, the processing of Steps S31 to S40 of FIG. 22 is performed. The processing of Steps S31 to Step S40 of FIG. 22 is substantially the same as the processing of the corresponding steps of FIG. 11 in one embodiment.

In Step S22, it is determined whether the motion answer mode is active. If the motion answer mode is active, the process returns to Step S21. In the case where the motion answer mode has been enabled in advance, when the submergence state in which the apparatus case 3 is located underwater is detected by the submergence detector 200, the motion answer mode is kept active. The user can cause the specific motion in a manner to perform a simple operation, thereby readily answering the incoming call to start a voice call. The user can thus start answering the incoming call at the time of his/her choice. If the motion answer mode is not active, the process proceeds to Step S23.

In Step S23, it is determined whether the submergence state exists. For example, the setting controller 112cA can recognize that the submergence state in which the apparatus case 3 is located underwater has been detected by the submergence detector 200. If no such submergence state exists, the process returns to Step S21. If the submergence state exists, the process proceeds to Step S24.

In Step S24, the motion answer mode is enabled. In the case where the motion answer mode has been disabled in advance, when the submergence state in which the apparatus case 3 is located underwater is detected by the submergence detector 200, the motion answer mode is enabled. The user can cause the specific motion in a manner to perform a simple operation, thereby readily answering the incoming call to start a voice call. The user can thus start answering the incoming call at the time of his/her choice.

In Step S25, it is determined whether the submergence state exists. For example, the setting controller 112cA can recognize whether the submergence state detected by the submergence detector 200 has ceased. The processing of Step S25 may be repeated until the submergence state ceases. When the submergence state ceases, the process may proceed to Step S26.

In Step S26, the motion answer mode is disabled. When the submergence state detected by the submergence detector 200 ceases, the motion answer mode is disabled. The electronic apparatus 1A can be accordingly placed back in the original mode specified by the user in advance. The user can answer the incoming call by performing the operation of his/her choice. When the processing of Step S26 is completed, the process returns to Step S21.

In Step S31 of FIG. 22, it is determined whether the motion answer mode is active. If the motion answer mode is active, the process proceeds to Step S32. If the motion answer mode is not active, the process proceeds to Step S36.

In Step S32, it is determined whether the submergence state exists. If no such submergence state exists, the process returns to Step S21 of FIG. 21. If the submergence state exists, the process proceeds to Step S33.

In Step S33, the motion answer mode is disabled.

In Step S34, it is determined whether the submergence state exists. For example, the setting controller 112cA can recognize whether the submergence state detected by the submergence detector 200 has ceased. The processing of Step S24 may be repeated until the submergence state ceases. When the submergence state ceases, the process may proceed to Step S35.

In Step S35, the motion answer mode is enabled. Then, the process returns to Step S21 of FIG. 21.

In Step S36, it is determined whether the submergence state exists. If no such submergence state exists, the process may return to Step S21 of FIG. 21. If the submergence state exists, the process may proceed to Step S37.

In Step S37, it is determined whether the submergence state exists. If the submergence state exists, the processing of Step S37 may be repeated. If no such submergence state exists, the process may proceed to Step S38.

In Step S38, the motion answer mode is enabled. Specifically, when the setting controller 112cA recognizes that the submergence state detected by the submergence detector 200 has ceased, the motion answer mode is enabled. The user can cause the specific motion in a manner to get the water off the electronic apparatus 1A, thereby readily answering the incoming call to start a voice call. The user can thus start answering the incoming call at the time of his/her choice.

In Step S39, it is determined whether the specific period of time has elapsed. The processing of Step S39 may be repeated until the specific period of time elapses. After a lapse of the specific period of time, the process may proceed to Step S40.

In Step S40, the motion answer mode is disabled. The electronic apparatus 1A can be accordingly placed back in the original mode specified by the user in advance. Then, the process returns to Step S21 of FIG. 21.

3. Modifications

3-1. First Modification

Figure 23:
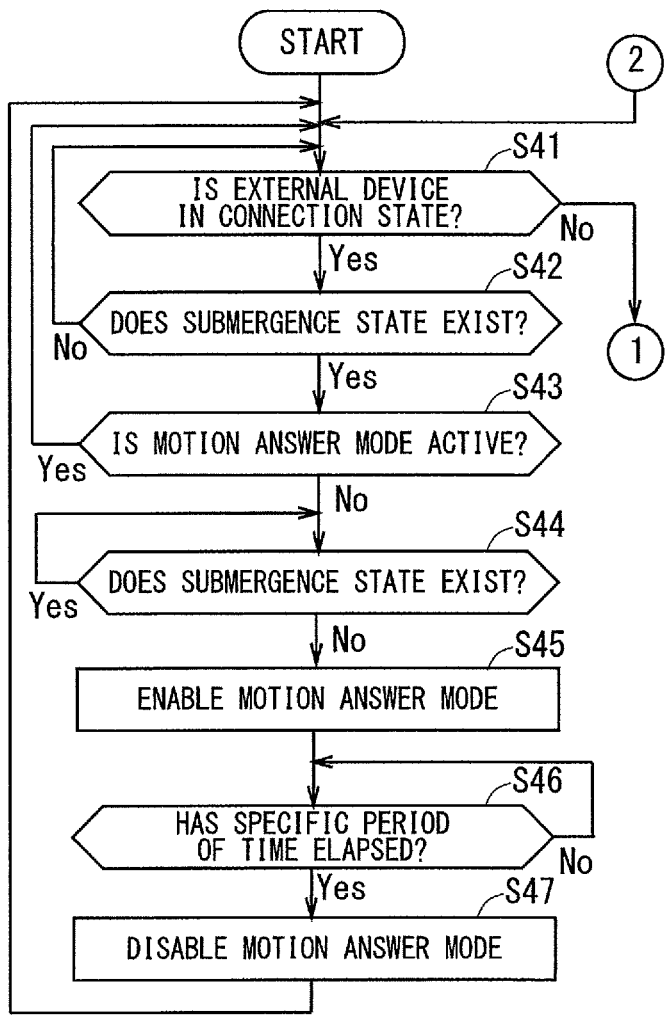
FIG. 23 illustrates a flowchart showing an example of a series of actions taken to control the setting status of the motion answer mode.

For one embodiment described in the section "2. Another Embodiment" above, the flowchart of FIG. 21 showing a series of actions taken to control the setting status of the motion answer mode may be replaced with the flowchart of FIG. 23 showing a series of actions taken to control the setting status of the motion answer mode. These actions taken to control the setting status of the motion answer mode may be achieved by executing the control program Pg2 by the controller 100.

In Step S41 of FIG. 23, it is determined whether the connection state, in which the external device 400 is communicably connected to the electronic apparatus 1A, exists. The connection state above can be recognized by the connection recognition unit 112d. If the connection state exists, the process proceeds to Step S42. If no such connection state exists, the process proceeds to Step S31 of FIG. 22. Specifically, if the connection state exists, the processing of Steps S42 to S47 of FIG. 23 is performed.

In Step S42, it is determined whether the submergence state exists. For example, the setting controller 112cA can recognize that the submergence state in which the apparatus case 3 is located underwater has been detected by the submergence detector 200. If no such submergence state exists, the process returns to Step S41. If the submergence state exists, the process proceeds to Step S43.

In Step S43, it is determined whether the motion answer mode is active. If the motion answer mode is active, the process returns to Step S41. In the case where the motion answer mode has been enabled in advance, when the submergence state in which the apparatus case 3 is located underwater is detected by the submergence detector 200, the motion answer mode is kept active. The user can cause the specific motion in a manner to perform a simple operation, thereby readily answering the incoming call to start a voice call. The user can thus start answering the incoming call at the time of his/her choice. If the motion answer mode is not active, the process proceeds to Step S44.

In Step S44, it is determined whether the submergence state exists. For example, the setting controller 112cA can recognize whether the submergence state detected by the submergence detector 200 has ceased. The processing of Step S44 may be repeated until the submergence state ceases. When the submergence state ceases, the process may proceed to Step S45. Thus, the motion answer mode that has been disabled in advance is kept inactive in the submergence state.

In Step S45, the motion answer mode is enabled. Specifically, when the setting controller 112cA recognizes that the submergence state detected by the submergence detector 200 has ceased, the setting controller 112cA enables the motion answer mode. The user can cause the specific motion in a manner to get the water off the electronic apparatus 1A, thereby readily answering the incoming call to start a voice call. The user can thus start answering the incoming call at the time of his/her choice.

In Step S46, it is determined whether the specific period of time has elapsed. The processing of Step S46 may be repeated until the specific period of time elapses. After a lapse of the specific period of time, the process may proceed to Step S47.

In Step S47, the motion answer mode is disabled. Then, the process returns to Step S41.

3-2. Second Modification

Figure 24:
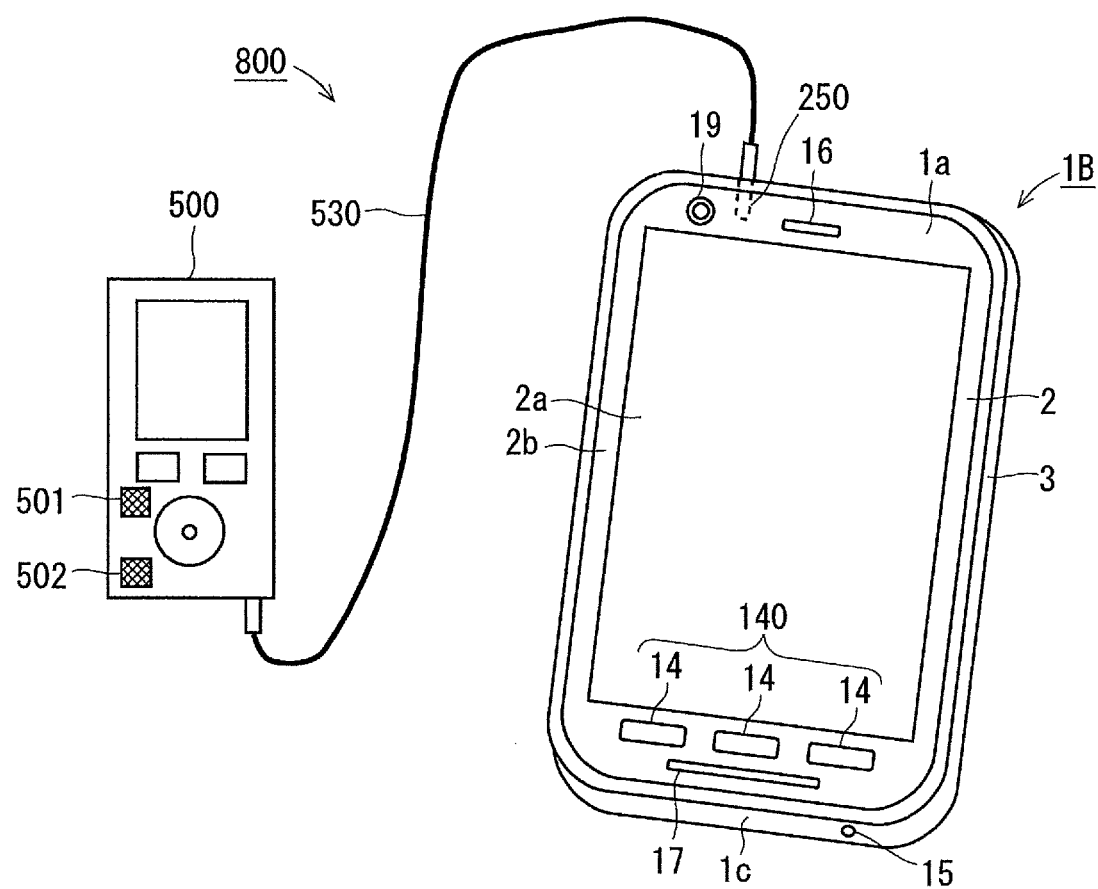
FIG. 24 illustrates a schematic perspective view of an example of the external appearance of the electronic apparatus system.

The electronic apparatus system 700 according to one embodiment mentioned above may be replaced with an electronic apparatus system 800 including, as illustrated in FIG. 24, an electronic apparatus 1B and an external device 500. The external device 500 is connected to the electronic apparatus 1B through a cable 530 for wired communication.

As illustrated in FIG. 24, the external device 500 includes a sound output unit 501 and a microphone unit 502. Examples of the external device 500 include a portable music player.

Figure 25:
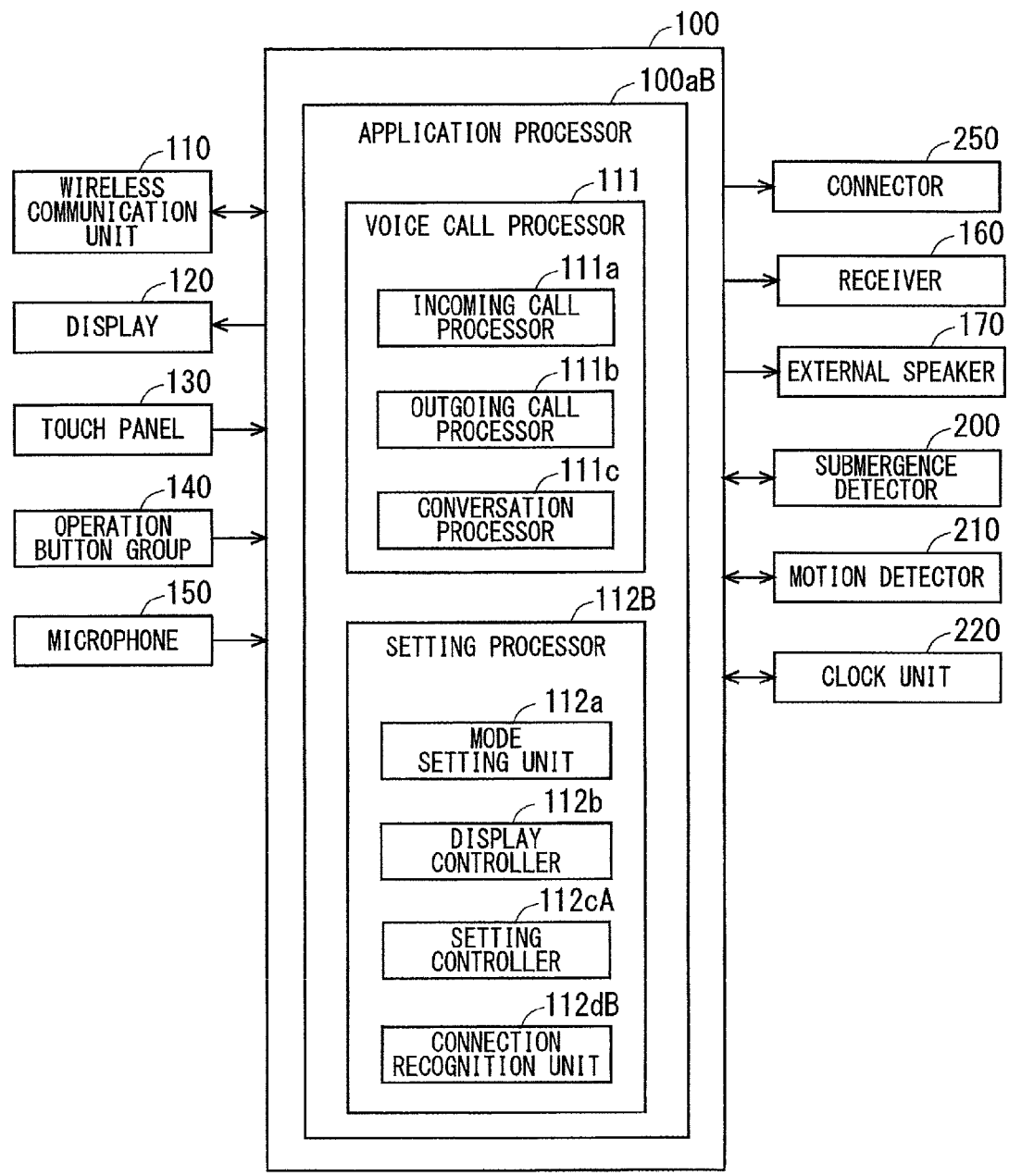
FIG. 25 schematically illustrates an example of the internal configuration of the controller.

As illustrated in FIGS. 24 and 25, the electronic apparatus 1B, which serves as an extension of the electronic apparatus 1A mentioned above, includes a connector 250 in place of the proximity wireless communication unit 240 and substitutes a connection recognition unit 112dB for the connection recognition unit 112d. The substitution of the connection recognition unit 112dB for the connection recognition unit 112d involves replacement of the setting processor 112A and the application processor 100aA with a setting processor 112B and an application processor 100aB.

The connector 250 can be connected with a first end of the cable 530. The external device 500 can be connected with a second end of the cable 530.

The connection recognition unit 112dB can recognize that the external device 500 is connected to the connector 250 through the cable 530. For example, the connection recognition unit 112dB can acquire identification information on the external device 500 through the cable 530 and the connector 250, to thereby recognize the connection state in which the external device 500 is communicably connected to the electronic apparatus 1B.

3-3. Third Modification

A plurality of parts that are, directly or indirectly, attached to one another may integrally constitute the apparatus case 3. The following will describe an electronic apparatus 1C, which is a concrete example of the above configuration.

FIG. 26 illustrates a schematic rear view of an example of an external appearance of the electronic apparatus 1C according to the third modification. The electronic apparatus 1C is, for example, a "waterproof" mobile phone such as a "waterproof" smartphone. In the electronic apparatus 1C, modules 3a to 3d attached to the cover panel 2 mainly constitutes the apparatus case 3. The module 3a is, for example, a camera unit with the first camera 180 embedded therein. The module 3b is, for example, a control unit with the controller 100 embedded therein for controlling the electronic apparatus 1C. The module 3c is, for example, a power supply unit with the battery 230 embedded therein for supplying power to the electronic apparatus 1C. The module 3d is, for example, a unit with an appropriate component embedded therein.

In this configuration, the module 3b, namely, the control unit of the electronic apparatus 1C includes the storage 103 that can store programs and the setting controllers 112c and 112cA that may be achieved by executing the programs by processors such as a CPU and a DSP. The setting controller 112c can control the processing in which the motion answer mode is enabled when the submergence state in which the apparatus case 3 of the electronic apparatus 1C is located underwater is no longer detected by the submergence detector 200.

In a case where a connection state in which the electronic apparatus 1C is connected to an external apparatus is recognized, when the submergence state in which the apparatus case 3 is located underwater is detected, the setting controllers 112c and 112cA can keep the motion answer mode that has been enabled in advance active. In the case where the connection state in which the electronic apparatus 1C is connected to the external apparatus is recognized, when the submergence state in which the apparatus case 3 is located underwater is detected, the setting controllers 112c and 112cA can enable the motion answer mode that has been disabled in advance.

3-4. Fourth Modification

Although the electronic apparatuses according to various embodiments and various modifications mentioned above each include the touch panel 130, the electronic apparatuses are not limited to this configuration. For example, each of the electronic apparatuses 1, 1A, 1B, and 1C may include no touch panel 130. In this case, the user conceivably fails to operate the operation button group 140 of each of the electronic apparatuses 1, 1A, 1B, and 1C properly with, for example, his/her gloved hand submerged in the water. Meanwhile, placing the electronic apparatuses 1, 1A, 1B, and 1C in the motion answer mode on an as-needed basis enables the user to start answering an incoming call at the time of his/her choice as in the various embodiments and the various modifications mentioned above.

3-5. Other Modifications

In addition to the icons on the status bar STB1, other signals that can be recognized by the user may indicate that the shake answer mode, which is the motion answer mode, is active, that the shake answer mode is inactive, that the shake answer mode is enabled, and that the shake answer mode is disabled. Examples of the signals that can be recognized by the user include, for example, flashes of LEDs and vibrations of the electronic apparatus.

While the electronic apparatuses 1, 1A, 1B, and 1C, the method for controlling the electronic apparatuses, the control unit of the electronic apparatuses, the electronic apparatus systems 700 and 800, and the control programs Pg1 and Pg2 have been described above in detail, the foregoing description is in all aspects illustrative and not restrictive. The various modifications described above are applicable in combination as long as they are consistent with each other. It is understood that numerous modifications which have not been exemplified can be devised without departing from the scope of the present disclosure.

What is claimed is:
1. An electronic apparatus comprising:
   an apparatus case;
   at least one processor configured to receive an incoming call from an external communication apparatus and to perform a voice call with the external communication apparatus;
   a submergence detector configured to detect a submergence state in which the apparatus case is located underwater; and
   a motion detector configured to detect a predetermined specific motion of the apparatus case, wherein
   the at least one processor controls a setting status of a motion answer mode in which the incoming call is answered and the voice call is accordingly started in response to detection, by the motion detector, of the specific motion, and
   when the submergence state is no longer detected by the submergence detector, the at least one processor enables the motion answer mode.
2. The electronic apparatus according to claim 1, wherein
   when the submergence state is detected by the submergence detector, the at least one processor disables the motion answer mode that has been enabled in advance, and
   when the submergence state is no longer detected by the submergence detector, the at least one processor enables the motion answer mode.
3. The electronic apparatus according to claim 2, wherein in a case where the at least one processor recognizes a connection state in which an external device including a sound output unit and a microphone unit is communicably connected to the electronic apparatus, when the submergence state is detected by the submergence detector, the at least one processor keeps the motion answer mode that has been enabled in advance active.
4. The electronic apparatus according to claim 1, wherein
   when the submergence state is no longer detected by the submergence detector, the at least one processor enables the motion answer mode that has been disabled in advance and keeps the motion answer mode active for a predetermined specific period of time, and
   after a lapse of the specific period of time, the at least one processor disables the motion answer mode.
5. The electronic apparatus according to claim 4, wherein in a case where the at least one processor recognizes a connection state in which an external device including a sound output unit and a microphone unit is communicably connected to the electronic apparatus, when the submergence state is detected by the submergence detector, the at least one processor enables the motion answer mode that has been disabled in advance.
6. The electronic apparatus according to claim 4, wherein
   in a case where the at least one processor recognizes a connection state in which an external device including a sound output unit and a microphone unit is communicably connected to the electronic apparatus, when the submergence state is detected by the submergence detector, the at least one processor keeps the motion answer mode that has been disabled in advance inactive,
   when the submergence state is no longer detected by the submergence detector, the at least one processor enables the motion answer mode and keeps the motion answer mode active for the predetermined specific period of time, and after a lapse of the specific period of time, the at least one processor disables the motion answer mode.

7. The electronic apparatus according to claim 3, wherein the external device includes a headset to be worn on a user's head.

8. An electronic apparatus comprising:

an apparatus case;

at least one processor configured to receive an incoming call from an external communication apparatus and to perform a voice call with the external communication apparatus;

a submergence detector configured to detect a submergence state in which the apparatus case is located underwater; and a motion detector configured to detect a predetermined specific motion of the apparatus case, wherein the at least one processor controls a setting status of a motion answer mode in which the incoming call is answered and the voice call is accordingly started in response to detection, by the motion detector, of the specific motion, and in a case where the at least one processor recognizes a connection state in which an external device including a sound output unit and a microphone unit is communicably connected to the electronic apparatus, when the submergence state is detected by the submergence detector, the at least one processor keeps the motion answer mode that has been enabled in advance active, and enables the motion answer mode that has been disabled in advance.

9. The electronic apparatus according to claim 8, wherein when the submergence state is detected by the submergence detector, the at least one processor keeps the motion answer mode that has been disabled in advance inactive, when the submergence state is no longer detected by the submergence detector, the at least one processor enables the motion answer mode and keeps the motion answer mode active for a predetermined specific period of time, and after a lapse of the specific period of time, the at least one processor disables the motion answer mode.

10. The electronic apparatus according to claim 1, wherein the specific motion includes a motion involving an act of shaking the apparatus case.

11. The electronic apparatus according to claim 8, wherein the specific motion includes a motion involving an act of shaking the apparatus case.

12. A method for controlling an electronic apparatus configured to control a setting status of a mode in which an incoming call from an external communication apparatus is answered and a voice call with the external communication apparatus is accordingly started, the method comprising:

recognizing that a submergence state in which the electronic apparatus is located underwater is detected, and enabling a motion answer mode when it is recognized that the submergence state has ceased, the motion answer mode being a mode in which the incoming call is answered and the voice call is accordingly started in response to detection of a predetermined specific motion of the electronic apparatus.

* * * * *